United States Patent
Chen et al.

(10) Patent No.: US 10,817,115 B2
(45) Date of Patent: Oct. 27, 2020

(54) METHOD FOR CONTROLLING SMARTWATCH, AND SMARTWATCH

(71) Applicant: Huawei Technologies Co., Ltd., Shenzhen (CN)

(72) Inventors: Yunzhe Chen, Shenzhen (CN); Xinyu Zhao, Shenzhen (CN); Qinghao Jin, Shenzhen (CN); Heshuai Si, Shenzhen (CN); Yangming Gong, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/464,199

(22) PCT Filed: Nov. 25, 2016

(86) PCT No.: PCT/CN2016/107337
§ 371 (c)(1),
(2) Date: May 24, 2019

(87) PCT Pub. No.: WO2018/094702
PCT Pub. Date: May 31, 2018

(65) Prior Publication Data
US 2019/0369835 A1 Dec. 5, 2019

(51) Int. Cl.
G06F 3/041 (2006.01)
G06F 3/044 (2006.01)
G06F 3/0488 (2013.01)

(52) U.S. Cl.
CPC ........ *G06F 3/04186* (2019.05); *G06F 3/044* (2013.01); *G06F 3/04883* (2013.01); *G06F 2203/04106* (2013.01)

(58) Field of Classification Search
CPC ... G06F 3/044; G06F 3/04186; G06F 3/04883
See application file for complete search history.

(56) References Cited

U.S. PATENT DOCUMENTS

2004/0252109 A1* 12/2004 Trent, Jr. ............... G06F 3/044
                                                         345/174
2007/0152983 A1*  7/2007 McKillop ........... G06F 3/0416
                                                         345/173
(Continued)

FOREIGN PATENT DOCUMENTS

CN    103902119 A    7/2014
CN    105159497 A    12/2015
(Continued)

OTHER PUBLICATIONS

Machine Translation and Abstract of Chinese Publication No. CN105159497, Dec. 16, 2015, 11 pages.
(Continued)

*Primary Examiner* — Kevin M Nguyen
(74) *Attorney, Agent, or Firm* — Conley Rose, P.C.

(57) ABSTRACT

A smartwatch and, a method for controlling the smartwatch, where a plurality of capacitive touch sensors is disposed around a screen of the smartwatch. The method includes obtaining a calibrated capacitance value of each capacitive touch sensor, determining a quantity of touch points based on maximum values of calibrated capacitance values of the N capacitive touch sensors, where each touch point corresponds to one capacitive touch sensor, determining a location of each touch point based on a calibrated capacitance value of a capacitive touch sensor corresponding to the touch point and a calibrated capacitance value of a capacitive touch sensor neighboring to the capacitive touch sensor, and executing a control instruction matching the quantity of touch points and the location of each touch point.

20 Claims, 9 Drawing Sheets

(56) References Cited

U.S. PATENT DOCUMENTS

| | | | |
|---|---|---|---|
| 2008/0042976 | A1 | 2/2008 | Trent, Jr. et al. |
| 2010/0073318 | A1* | 3/2010 | Hu .................... G06F 3/04883 345/174 |
| 2011/0157074 | A1 | 6/2011 | Lin et al. |
| 2014/0176488 | A1 | 6/2014 | Jo |
| 2014/0347289 | A1* | 11/2014 | Suh .................... G06F 1/163 345/173 |
| 2016/0124601 | A1 | 5/2016 | Hsiao et al. |
| 2017/0235439 | A1* | 8/2017 | Lu .................... G06F 3/04845 715/812 |

FOREIGN PATENT DOCUMENTS

| | | |
|---|---|---|
| CN | 105159512 A | 12/2015 |
| CN | 105302383 A | 2/2016 |
| CN | 106055255 A | 10/2016 |
| KR | 20160078709 A | 7/2016 |
| TW | 201122974 A | 7/2011 |

OTHER PUBLICATIONS

Machine Translation and Abstract of Chinese Publication No. CN105159512, Dec. 16, 2015, 12 pages.

Machine Translation and Abstract of Chinese Publication No. CN105302383, Feb. 3, 2016, 28 pages.

Machine Translation and Abstract of Chinese Publication No. CN106055255, Oct. 26, 2016, 30 pages.

Machine Translation and Abstract of Korean Publication No. KR20160078709, Jul. 5, 2016, 40 pages.

Foreign Communication From a Counterpart Application, Chinese Application No. 201680069092.6, Chinese Office Action dated May 7, 2019, 6 pages.

Foreign Communication From a Counterpart Application, PCT Application No. PCT/CN2016/107337, English Translation of International Search Report dated Jul. 28, 2017, 2 pages.

Foreign Communication From a Counterpart Application, PCT Application No. PCT/CN2016/107337, English Translation of Written Opinion dated Jul. 28, 2017, 4 pages.

"Reading, calibrating and normalizing the sensor values," XP055623490, Dec. 13, 2015, Retrieved from http://theultimatelinefollower.blogspot.com/2015/12/reading-calibrating-and-normalizing.html on Sep. 18, 2019, 5 pages.

Foreign Communication From a Counterpart Application, European Application No. 16922500.0, Extended European Search Report dated Sep. 25, 2019, 7 pages.

"Reading, calibrating and normalizing the sensor values," XP055623490, dated Dec. 13, 2015, Retrieved from http://theultimatelinefollower.blogspot.com/2015/12/reading-calibrating-and-normalizing.html on Sep. 18, 2019, 5 pages.

Akhtar, H., et al., "A comparative analysis of capacitive touch panel grid designs and interpolation methods," KP032963886, 2014 IEEE International Conference on Image Processing (ICIP), 5 pages.

\* cited by examiner

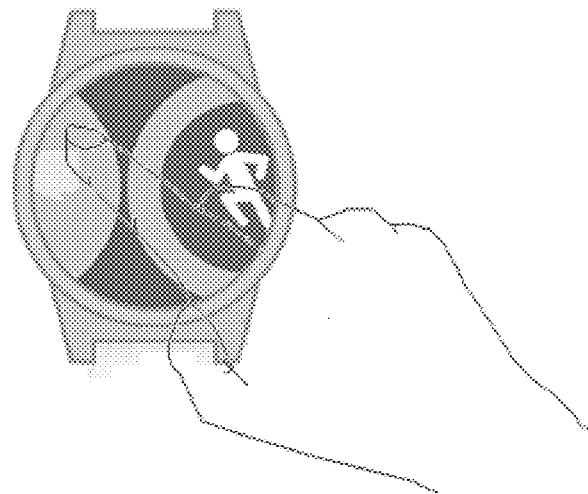
PRIOR ART
FIG. 1-a
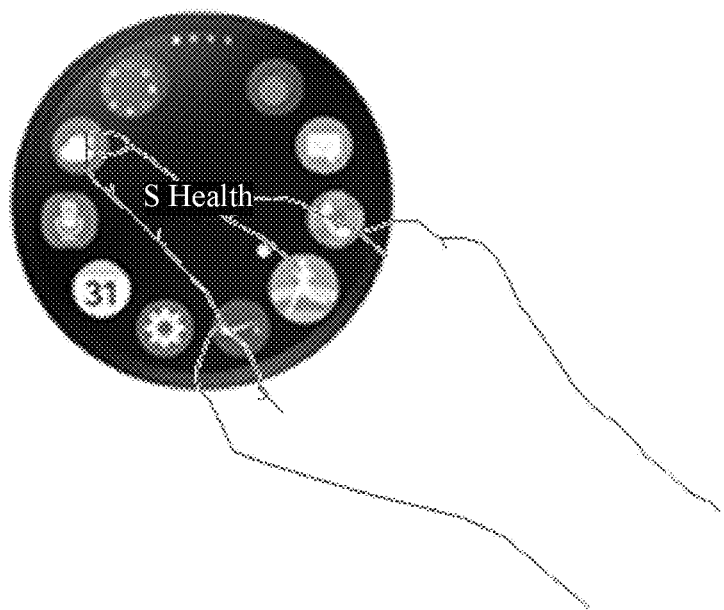
PRIOR ART
FIG. 1-b

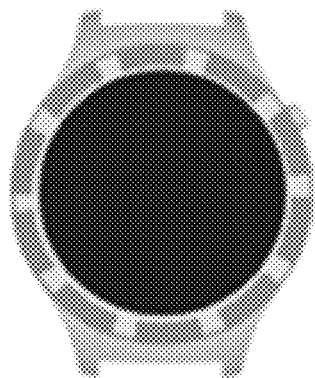
PRIOR ART
FIG. 1-c
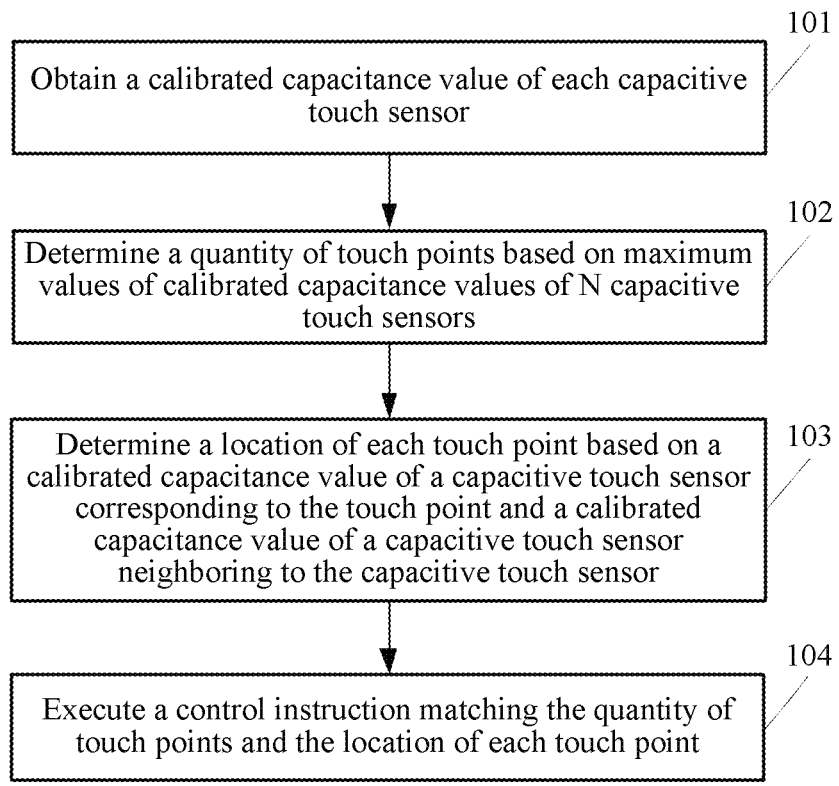
FIG. 2-a1

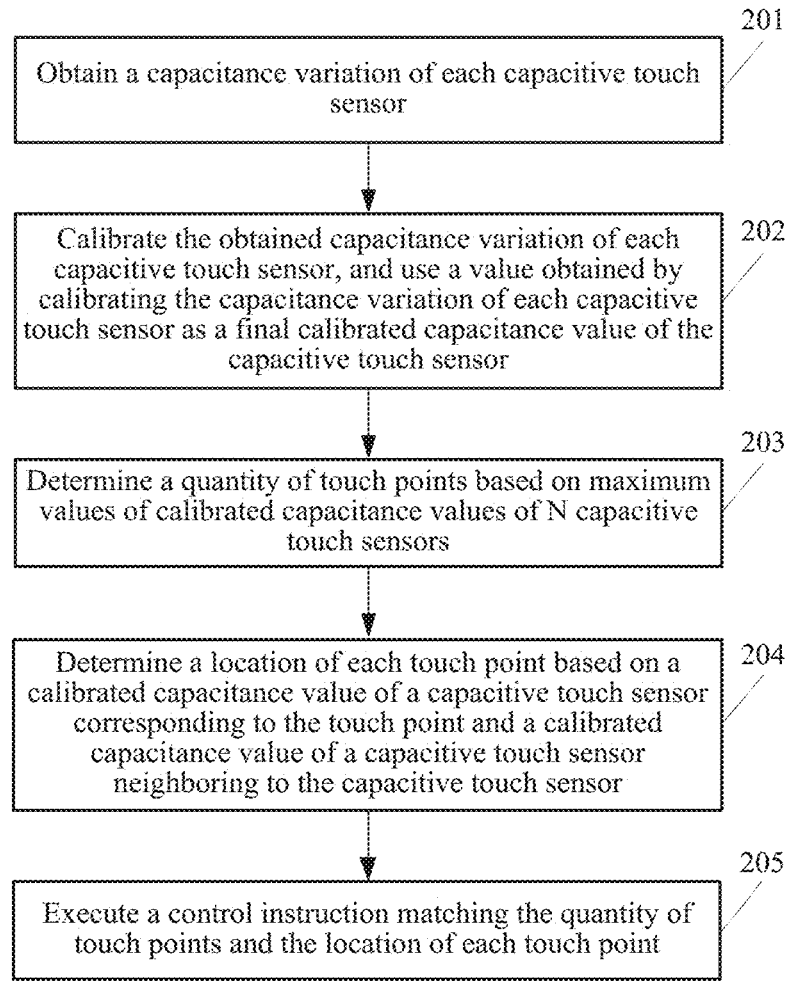
FIG. 2-a2
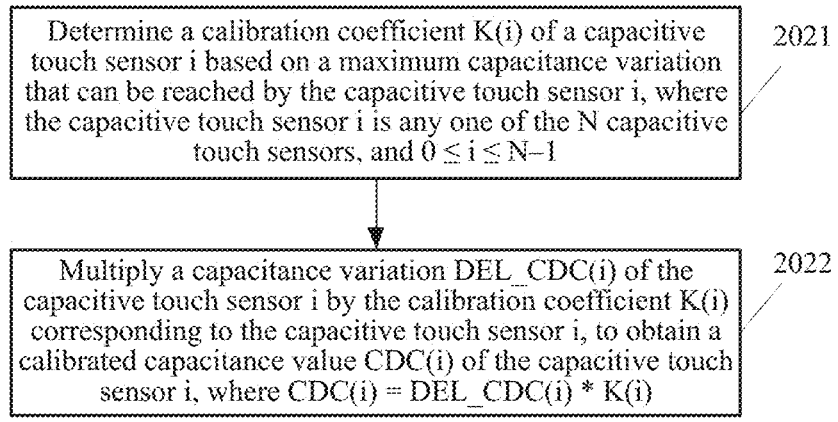
FIG. 2-b

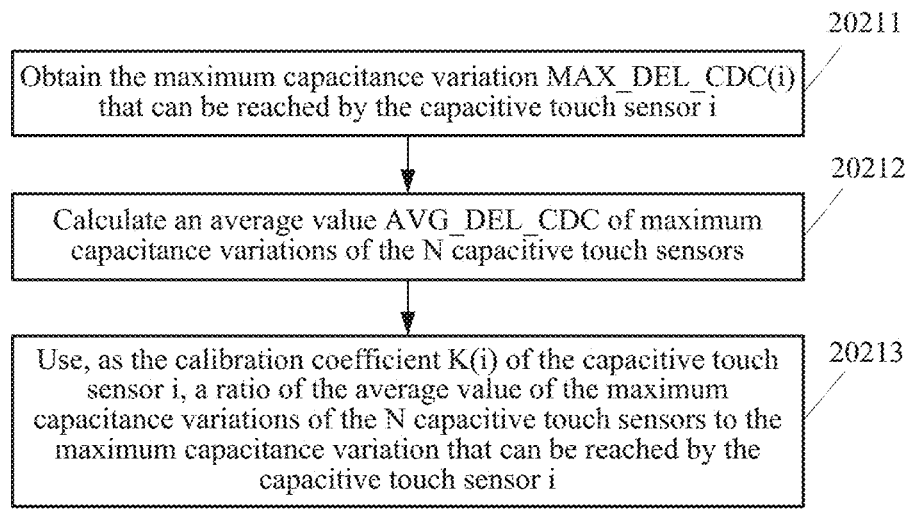
FIG. 2-c
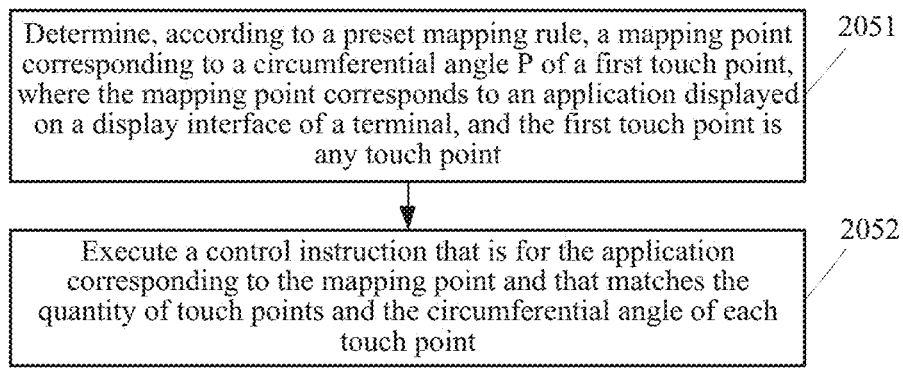
FIG. 2-d

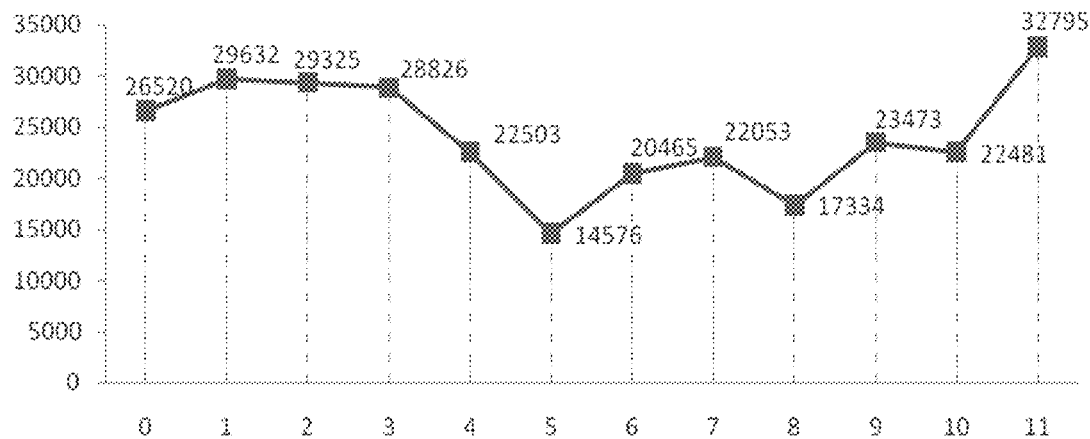
FIG. 2-e
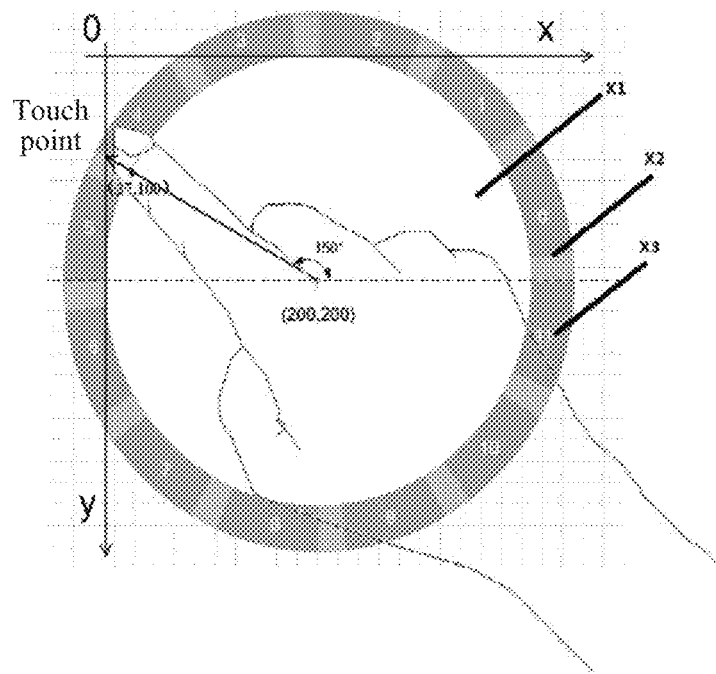
FIG. 2-f

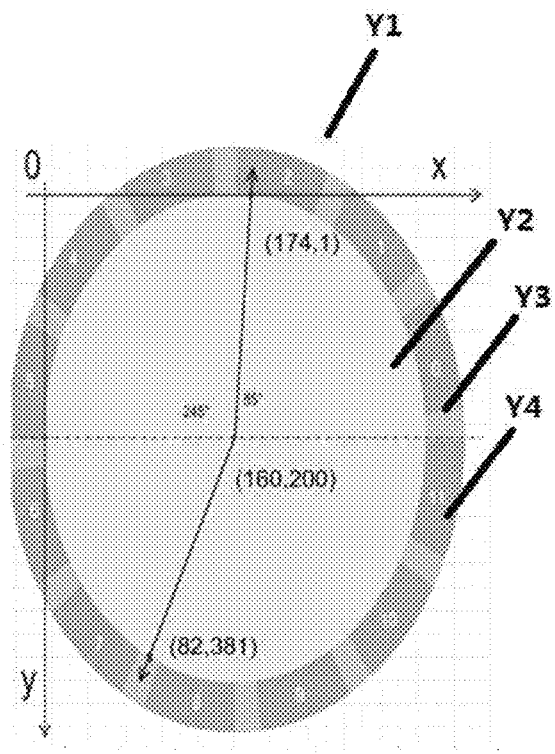
FIG. 5
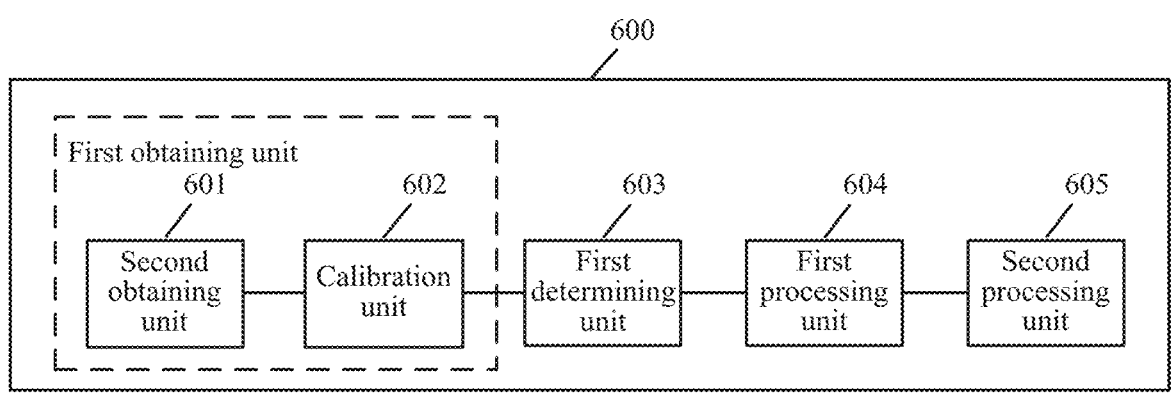
FIG. 6-a

FIG. 6-b

METHOD FOR CONTROLLING SMARTWATCH, AND SMARTWATCH

CROSS-REFERENCE TO RELATED APPLICATIONS

This application is a U.S. Nation Stage of International Application No. PCT/CN2016/107337 filed on Nov. 25, 2016, which is hereby incorporated by reference in its entirety.

TECHNICAL FIELD

The present invention relates to the field of terminal technologies, and in particular, to a method for controlling a smartwatch, and a smartwatch.

BACKGROUND

A smartwatch is a watch having an information processing capability. In addition to a function of time indication, the smartwatch may further have a plurality of functions such as making a phone call, sending and receiving information, navigation, counting steps, and playing music. These functions may be implemented by using application software installed on the smartwatch. A function can be used provided that corresponding application software is enabled or corresponding enabled application software is controlled.

Currently, when the smartwatch is controlled, a touch operation is usually performed in an area on a touchscreen of a watch face. Because the touchscreen of the smartwatch is usually relatively small, when an operation is performed on the touchscreen by using a finger, content displayed on the touchscreen is prone to be obscured by the finger. In addition, a quantity of control icons displayed at once in a display user interface of the touchscreen is relatively small. Usually, to search for a control instruction, an icon corresponding to the control instruction that needs to be searched for can appear only after invoking a plurality of display user interfaces. A search path is relatively long, operations are complex, and a relatively long time is consumed.

SUMMARY

Embodiments of the present invention provide a method for controlling a smartwatch, and a smartwatch, to increase a control point in the smartwatch, thereby helping shorten a path for searching for a control instruction in the smartwatch, simplify an operation procedure, and improve efficiency of operating the smartwatch.

A first aspect of an embodiment of the present invention provides a method for controlling a smartwatch. N capacitive touch sensors are disposed around a watch face of the smartwatch, and N is an integer greater than 1. The method includes:

obtaining a calibrated capacitance value of each capacitive touch sensor;

determining a quantity of touch points based on maximum values of the calibrated capacitance values of the N capacitive touch sensors, where each touch point corresponds to one capacitive touch sensor;

determining a location of each touch point based on a calibrated capacitance value of a capacitive touch sensor corresponding to the touch point and a calibrated capacitance value of a capacitive touch sensor neighboring to the capacitive touch sensor; and executing a control instruction matching the quantity of touch points and the location of each touch point.

In this embodiment of the present invention, the quantity of touch points and the location of the touch point are determined by using a capacitance value of the capacitive touch sensor, and the control instruction matching the quantity of touch points and the location of each touch point is executed. Compared with the prior art in which a smartwatch can only generate touch instructions whose quantity is the same as a quantity of capacitive touch sensors, in this embodiment of the present invention, one capacitive touch sensor may correspond to a plurality of touch instructions, and different touch instructions may be executed based on different quantities and locations of touch points when a user touches a plurality of capacitive touch sensors. Therefore, according to this embodiment of the present invention, a quantity of control points in the smartwatch is increased, thereby helping shorten a path for searching for the control instruction in the smartwatch, simplify an operation procedure, and improve efficiency of operating the smartwatch.

Optionally, in some possible implementations of the present invention, the obtaining a calibrated capacitance value of each capacitive touch sensor includes:

obtaining a capacitance variation of each capacitive touch sensor, where the capacitance variation of the capacitive touch sensor is a capacitance value of the capacitive touch sensor minus an initial value of the capacitive touch sensor, and the initial value is a capacitance value of the capacitive touch sensor when a user does not touch the smartwatch; and calibrating the obtained capacitance variation of each capacitive touch sensor, and using a value obtained by calibrating the capacitance variation of each capacitive touch sensor as the calibrated capacitance value of the capacitive touch sensor.

Optionally, in some possible implementations of the present invention, the calibrating the obtained capacitance variation of each capacitive touch sensor, and using a value obtained by calibrating the capacitance variation of each capacitive touch sensor as the calibrated capacitance value of the capacitive touch sensor includes:

determining a calibration coefficient $K(i)$ of a capacitive touch sensor i based on a maximum capacitance variation that can be reached by the capacitive touch sensor i, where the capacitive touch sensor i is any one of the N capacitive touch sensors, and $0 \leq i \leq N-1$; and multiplying a capacitance variation $DEL\_CDC(i)$ of the capacitive touch sensor i by the calibration coefficient $K(i)$ corresponding to the capacitive touch sensor i, to obtain a calibrated capacitance value $CDC(i)$ of the capacitive touch sensor i, where $CDC(i)=DEL\_CDC(i)*K(i)$.

Optionally, in some possible implementations of the present invention, the determining a calibration coefficient $K(i)$ of a capacitive touch sensor i based on a maximum capacitance variation that can be reached by the capacitive touch sensor i includes:

obtaining the maximum capacitance variation $MAX\_DEL\_CDC(i)$ that can be reached by the capacitive touch sensor i;

calculating an average value $AVG\_DEL\_CDC$ of maximum capacitance variations of the N capacitive touch sensors, where $$AVG\_DEL\_CDC = \frac{\sum_{j=0}^{N-1} MAX\_DEL\_CDC(j)}{N};$$

and using, as the calibration coefficient K(i) of the capacitive touch sensor i, a ratio of the average value of the maximum capacitance variations of the N capacitive touch sensors to the maximum capacitance variation that can be reached by the capacitive touch sensor i, that is, $$K(i) = \frac{AVG\_DEL\_CDC}{MAX\_DEL\_CDC(i)}.$$

Optionally, in some possible implementations of the present invention, the determining a quantity of touch points based on maximum values of the calibrated capacitance values of the N capacitive touch sensors includes:

comparing the maximum values of the calibrated capacitance values of the N capacitive touch sensors with a preset capacitance threshold; and using a quantity of calibrated capacitance values that are in the calibrated capacitance values of the N capacitive touch sensors and whose maximum values are greater than the capacitance threshold as the quantity of touch points.

Optionally, in some possible implementations of the present invention, the determining a location of each touch point based on a calibrated capacitance value of a capacitive touch sensor corresponding to the touch point and a calibrated capacitance value of a capacitive touch sensor neighboring to the capacitive touch sensor includes:

determining a circumferential angle P of each touch point based on a calibrated capacitance value of a capacitive touch sensor corresponding to the touch point and a calibrated capacitance value of a capacitive touch sensor neighboring to the capacitive touch sensor, where using a center point of a display user interface of the smartwatch as a start point and using an angle corresponding to a ray horizontally extending rightward from the start point as 0°, the circumferential angle P is an angle by which the ray rotates around the start point in a counterclockwise direction to the touch point.

Optionally, in some possible implementations of the present invention, the executing a control instruction matching the quantity of touch points and the location of each touch point includes:

determining, according to a preset mapping rule, a mapping point corresponding to a circumferential angle P of a first touch point, where the mapping point corresponds to an application displayed on the display user interface of the smartwatch, and the first touch point is any touch point; and executing a control instruction that is for the application corresponding to the mapping point and that matches the quantity of touch points and the circumferential angle of each touch point.

Optionally, in some possible implementations of the present invention, the determining, according to a preset mapping rule, a mapping point corresponding to a circumferential angle P of a first touch point includes:

determining, based on a location of the application displayed on the display user interface of the smartwatch, a geometric shape defined by the N capacitive touch sensors, and the circumferential angle of the first touch point, the mapping point corresponding to the circumferential angle of the first touch point.

Optionally, in some possible implementations of the present invention, the determining a circumferential angle P of each touch point based on a calibrated capacitance value of a capacitive touch sensor corresponding to the touch point and a calibrated capacitance value of a capacitive touch sensor neighboring to the capacitive touch sensor includes:

if each of the N capacitive touch sensors is in a circular arc shape, the N capacitive touch sensors define a circular ring or an elliptical ring, and a circumferential angle of a touch point located on a capacitive touch sensor k is P, $$P = APS*((k-1+N)\%\ N) + \\ \frac{APS*[CDC((k-1+N)\%\ N)*1 + CDC(k)*2 + CDC((k+1+N)\%\ N)*3]}{CDC((k-1+N)\%\ N) + CDC(k) + CDC((k+1+N)\%\ N)}$$

where $0 \le k \le N-1$, APS is a value of a circumferential angle corresponding to one capacitive touch sensor, that is, APS=360/N, % is a modulo operator, the N capacitive touch sensors are sequentially numbered 0 to N−1 counterclockwise, and capacitive touch sensor 0 is the first capacitive touch sensor that is disposed horizontally upward and that is located on a right side of the center point of the display user interface of the smartwatch.

Optionally, in some possible implementations of the present invention, the determining, based on a location of the application displayed on the display user interface of the smartwatch, a geometric shape defined by the N capacitive touch sensors, and the circumferential angle of the first touch point, the mapping point corresponding to the circumferential angle of the first touch point includes:

if each of the N capacitive touch sensors is in a circular arc shape, the N capacitive touch sensors define a circular ring, a radius of an inner circle of the circular ring is r, coordinates of a circle center are (a, b), an origin of a Cartesian coordinate system is in an upper left corner of the inner circle of the circular ring, the horizontal coordinate is tangent to the inner circle of the circular ring horizontally rightward, the vertical coordinate is tangent to the inner circle of the circular ring vertically downward, and a center point of an icon of each application that is displayed on the display user interface of the smartwatch is located on a circular contour using (a, b) as a circle center and $r_1$ as a radius, then coordinates of the mapping point corresponding to the circumferential angle P of the first touch point are (x, y), where $x=a+r_1*\cos(P)$, $y=b-r_1*\sin(P)$, and $0<r_1 \le r$.

Optionally, in some possible implementations of the present invention, the determining, based on a location of the application displayed on the display user interface of the smartwatch, a geometric shape defined by the N capacitive touch sensors, and the circumferential angle of the first touch point, the mapping point corresponding to the circumferential angle of the first touch point includes:

if each of the N capacitive touch sensors is in a circular arc shape, the N capacitive touch sensors define an elliptical ring, coordinates of a center point of the elliptical ring are (a, b), a major radius of an inner ellipse of the elliptical ring is Lr, a minor radius is Sr, a center point of an icon of each application that is displayed on the display user interface of the smartwatch is located on an elliptical contour using (a, b) as a center point, Lr' as a major radius, and Sr' as a minor radius, $0<Lr' \le Lr$, and $0<Sr' \le Sr$, then coordinates of the mapping point corresponding to the circumferential angle P of the first touch point are (x, y), where $x=a+Sr'*\cos(P)$, $y=b-Lr'*\sin(P)$, the major radii Lr and Lr' are oriented vertically, and the minor radii Sr and Sr' are oriented horizontally.

In this embodiment of the present invention, the quantity of touch points and the location of the touch point may be determined by using a capacitance value of the capacitive touch sensor, and the control instruction matching the quantity of touch points and the location of each touch point may be executed. Compared with the prior art in which a smartwatch can only generate touch instructions whose quantity is the same as a quantity of capacitive touch sensors, in this embodiment of the present invention, one capacitive touch sensor may correspond to a plurality of touch instructions, and different touch instructions may be executed based on different quantities and locations of touch points when a user touches a plurality of capacitive touch sensors. Therefore, according to this embodiment of the present invention, a control point in the smartwatch is increased, thereby helping shorten a path for searching for the control instruction in the smartwatch, simplify an operation procedure, and improve efficiency of operating the smartwatch.

A second aspect of an embodiment of the present invention provides a smartwatch; N capacitive touch sensors are disposed around a watch face of the smartwatch, and N is an integer greater than 1. The smartwatch further includes:

a first obtaining unit, configured to obtain a calibrated capacitance value of each capacitive touch sensor;

a first determining unit, configured to determine a quantity of touch points based on maximum values of the calibrated capacitance values that are of the N capacitive touch sensors and that are obtained by the first obtaining unit, where each touch point corresponds to one capacitive touch sensor;

a first processing unit, configured to determine a location of each touch point based on a calibrated capacitance value of a capacitive touch sensor corresponding to the touch point and a calibrated capacitance value of a capacitive touch sensor neighboring to the capacitive touch sensor; and a second processing unit, configured to execute a control instruction matching the quantity of touch points and the location of each touch point.

Optionally, in some possible implementations of the present invention, the first obtaining unit includes a second obtaining unit and a calibration unit.

The second obtaining unit is configured to obtain a capacitance variation of each capacitive touch sensor. The capacitance variation of the capacitive touch sensor is a capacitance value of the capacitive touch sensor minus an initial value of the capacitive touch sensor, and the initial value is a capacitance value of the capacitive touch sensor when a user does not touch the smartwatch.

The calibration unit is configured to: calibrate the capacitance variation of each capacitive touch sensor that is obtained by the second obtaining unit, and use a value obtained by calibrating the capacitance variation of each capacitive touch sensor as the calibrated capacitance value of the capacitive touch sensor.

Optionally, in some possible implementations of the present invention, the calibration unit includes a second determining unit and a third processing unit.

The second determining unit is configured to determine a calibration coefficient $K(i)$ of a capacitive touch sensor i based on a maximum capacitance variation that can be reached by the capacitive touch sensor i. The capacitive touch sensor i is any one of the N capacitive touch sensors, and $0 \le i \le N-1$.

The third processing unit is configured to multiply a capacitance variation $DEL\_CDC(i)$ of the capacitive touch sensor i by the calibration coefficient $K(i)$ corresponding to the capacitive touch sensor i, to obtain a calibrated capacitance value $CDC(i)$ of the capacitive touch sensor 1, where $$CDC(i)=DEL\_CDC(i)*K(i).$$

Optionally, in some possible implementations of the present invention, the second determining unit includes a third obtaining unit, a fourth processing unit, and a fifth processing unit.

The third obtaining unit is configured to obtain the maximum capacitance variation $MAX\_DEL\_CDC(i)$ that can be reached by the capacitive touch sensor i.

The fourth processing unit is configured to calculate an average value $AVG\_DEL\_CDC$ of maximum capacitance variations of the N capacitive touch sensors, where $$AVG\_DEL\_CDC = \frac{\sum_{j=0}^{N-1} MAX\_DEL\_CDC(j)}{N}.$$

The fifth processing unit is configured to use, as the calibration coefficient $K(i)$ of the capacitive touch sensor i, a ratio of the average value of the maximum capacitance variations of the N capacitive touch sensors to the maximum capacitance variation that can be reached by the capacitive touch sensor i, that is, $$K(i) = \frac{AVG\_DEL\_CDC}{MAX\_DEL\_CDC(i)}.$$

Optionally, in some possible implementations of the present invention, the first determining unit includes a comparison unit and a sixth processing unit.

The comparison unit is configured to compare the maximum values of the calibrated capacitance values of the N capacitive touch sensors with a preset capacitance threshold.

The sixth processing unit is configured to use a quantity of calibrated capacitance values that are in the calibrated capacitance values of the N capacitive touch sensors and whose maximum values are greater than the capacitance threshold as the quantity of touch points.

Optionally, in some possible implementations of the present invention, the first processing unit is specifically configured to determine a circumferential angle P of each touch point based on a calibrated capacitance value of a capacitive touch sensor corresponding to the touch point and a calibrated capacitance value of a capacitive touch sensor neighboring to the capacitive touch sensor, where using a center point of a display user interface of the smartwatch as a start point and using an angle corresponding to a ray horizontally extending rightward from the start point as 0°, the circumferential angle P is an angle by which the ray rotates around the start point in a counterclockwise direction to the touch point.

Optionally, in some possible implementations of the present invention, the second processing unit includes a third determining unit and an execution unit.

The third determining unit is configured to determine, according to a preset mapping rule, a mapping point corresponding to a circumferential angle P of a first touch point. The mapping point corresponds to an application displayed on the display user interface of the smartwatch, and the first touch point is any touch point.

The execution unit is configured to execute a control instruction that is for the application corresponding to the mapping point and that matches the quantity of touch points and the circumferential angle of each touch point.

Optionally, in some possible implementations of the present invention, the third determining unit is specifically configured to determine, based on a location of the application displayed on the display user interface of the smartwatch, a geometric shape defined by the N capacitive touch sensors, and the circumferential angle of the first touch point, the mapping point corresponding to the circumferential angle of the first touch point.

Optionally, in some possible implementations of the present invention, the first processing unit is specifically configured to: if each of the N capacitive touch sensors is in a circular arc shape, the N capacitive touch sensors define a circular ring or an elliptical ring, and a circumferential angle of a touch point located on a capacitive touch sensor k is P.

$$P = APS*((k-1+N)\% N) + \frac{APS*[CDC((k-1+N)\% N)*1 + CDC(k)*2 + CDC((k+1+N)\% N)*3]}{CDC((k-1+N)\% N) + CDC(k) + CDC((k+1+N)\% N)}$$

where $0 \leq k \leq N-1$, APS is a value of a circumferential angle corresponding to one capacitive touch sensor, that is, APS=360/N, % is a modulo operator, the N capacitive touch sensors are sequentially numbered 0 to N−1 counterclockwise, and capacitive touch sensor 0 is the first capacitive touch sensor that is disposed horizontally upward and that is located on a right side of the center point of the display user interface of the smartwatch.

Optionally, in some possible implementations of the present invention, the third determining unit is specifically configured to: if each of the N capacitive touch sensors is in a circular arc shape, the N capacitive touch sensors define a circular ring, a radius of an inner circle of the circular ring is r, coordinates of a circle center are (a, b), an origin of a Cartesian coordinate system is in an upper left corner of the inner circle of the circular ring, the horizontal coordinate is tangent to the inner circle of the circular ring horizontally rightward, the vertical coordinate is tangent to the inner circle of the circular ring vertically downward, and a center point of an icon of each application that is displayed on the display user interface of the smartwatch is located on a circular contour using (a, b) as a circle center and $r_1$ as a radius, then coordinates of the mapping point corresponding to the circumferential angle P of the first touch point are (x, y), where $x=a+r_1*\cos(P)$, $y=b-r_1*\sin(P)$, and $0<r_1 \leq r$.

Optionally, in some possible implementations of the present invention, the third determining unit is specifically configured to: if each of the N capacitive touch sensors is in a circular arc shape, the N capacitive touch sensors define an elliptical ring, coordinates of a center point of the elliptical ring are (a, b), a major radius of an inner ellipse of the elliptical ring is Lr, a minor radius is Sr, a center point of an icon of each application that is displayed on the display user interface of the smartwatch is located on an elliptical contour using (a, b) as a center point, Lr' as a major radius, and Sr' as a minor radius, $0<Lr' \leq Lr$, and $0<Sr' \leq Sr$, then coordinates of the mapping point corresponding to the circumferential angle P of the first touch point are (x, y), where $x=a+Sr'*\cos(P)$, $y=b-Lr'*\sin(P)$, the major radii Lr and Lr' are oriented vertically, and the minor radii Sr and Sr' are oriented horizontally.

A third aspect of an embodiment of the present invention provides a smartwatch. The smartwatch includes a plurality of capacitive touch sensors disposed around a watch face of the smartwatch, a capacitance measurement unit, a processor, a memory, and a bus.

The plurality of capacitive touch sensors are connected to the capacitance measurement unit, the capacitance measurement unit, the processor, and the memory are coupled to each other by using the bus.

The memory is configured to store computer-executable program code, the executable program code includes an instruction, and when the processor executes the instruction, the instruction causes the smartwatch to perform the method for controlling a smartwatch according to the first aspect and various possible implementations of the first aspect and beneficial effects that are brought about. Therefore, for implementation of the smartwatch, refer to implementation of the method for controlling a smartwatch according to the first aspect and various possible implementations of the first aspect, and repeated parts are not described again.

A fourth aspect of an embodiment of the present invention provides a storage medium. The storage medium is a non-volatile computer-readable storage medium, the non-volatile computer-readable storage medium stores at least one program, each program includes an instruction, and when executed by a smartwatch with a processor, the instruction causes the smartwatch to perform the control method according to the first aspect and various possible implementations of the first aspect, and repeated parts are not described again.

In the embodiments of the present invention, the quantity of touch points and the location of the touch point may be determined by using the capacitance value of the capacitive touch sensor, and the smartwatch may be controlled to execute the control instruction matching the quantity of touch points and the location of each touch point. In the embodiments of the present invention, when touch is performed at different locations on the capacitive touch sensor, there may correspondingly be a plurality of touch instructions. When the user touches a plurality of capacitive touch sensors, there may correspondingly be different touch instructions depending on different quantities and locations of touch points. Therefore, the embodiments of the present invention help shorten a path for searching for the control instruction in the smartwatch, simplify an operation procedure, and improve efficiency of operating the smartwatch.

BRIEF DESCRIPTION OF DRAWINGS

FIG. 1-*a* is a schematic operation diagram of controlling a smartwatch in the prior art;

FIG. 1-*b* is a schematic operation diagram of controlling a smartwatch in the prior art;

FIG. 1-*c* is a schematic diagram of a smartwatch including a plurality of capacitive touch sensors in the prior art;

FIG. 2-*a*1 is a schematic flowchart of a method for controlling a smartwatch according to an embodiment of the present invention;

FIG. 2-*a*2 is another schematic flowchart of a method for controlling a smartwatch according to an embodiment of the present invention;

FIG. 2-*b* is a schematic flowchart of step 202 in FIG. 2-*a*2 during specific implementation;

FIG. 2-c is a schematic flowchart of step 2021 in FIG. 2-b during specific implementation;

FIG. 2-d is a schematic flowchart of step 205 in FIG. 2-a2 during specific implementation;

FIG. 2-e is a schematic diagram of a maximum capacitance value of each capacitive touch sensor according to an embodiment of the present invention;

FIG. 2-f is a schematic diagram of a single-finger operation according to an embodiment of the present invention;

FIG. 5 is a schematic diagram of a location of each capacitive touch sensor according to an embodiment of the present invention;

FIG. 6-b is a schematic structural diagram of a smartwatch according to an embodiment of the present invention.

DESCRIPTION OF EMBODIMENTS

Figure 3:
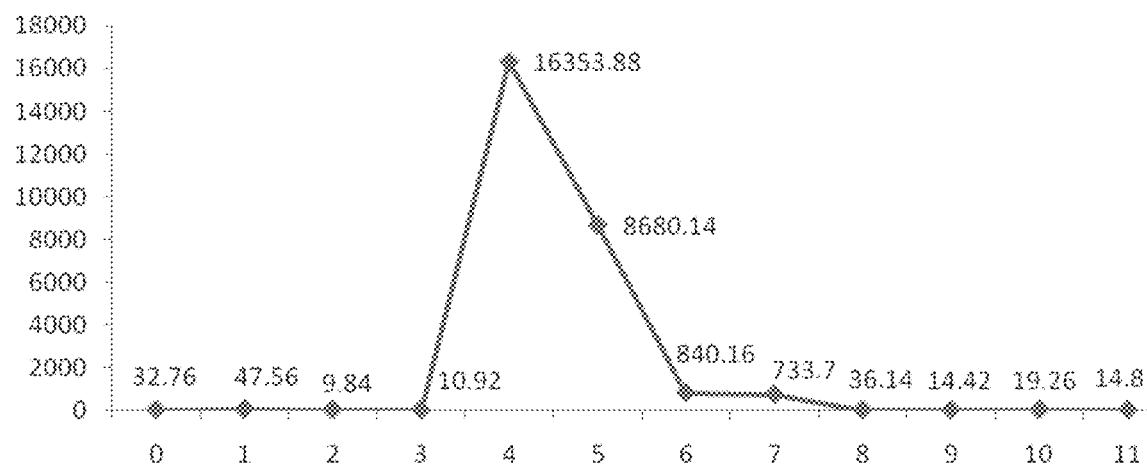
FIG. 3 is a schematic diagram of a calibrated capacitance value of each capacitive touch sensor according to an embodiment of the present invention.

Embodiments of the present invention provide a method for controlling a smartwatch, and a smartwatch, to increase a control point in the smartwatch, thereby helping shorten a path for searching for the control instruction in the smartwatch, simplify an operation procedure, and improve efficiency of operating the smartwatch.

In the embodiments of the present invention, a plurality of capacitive touch sensors are disposed around a watch face of the smartwatch. The capacitive touch sensor may be an arc-shaped strip-like metal sheet or indium tin oxide (Indium Tin Oxide, ITO) film. It should be noted that the smartwatch includes a housing and a watch strap. The housing includes a lug connected to the watch strap, the watch face covered with a touchscreen, and a watch bezel located outside the touchscreen. When the touchscreen is circular, the watch bezel may be a circular ring. When the touchscreen is elliptical, the watch bezel may be an elliptical ring. For example, when a plurality of capacitive touch sensors are disposed on the watch bezel of the smartwatch, if the touchscreen is circular, the plurality of capacitive touch sensors may be evenly disposed on the watch bezel and in a circular ring using a center of the touchscreen of the smartwatch as a circle center, and certainly, may alternatively be evenly disposed on the watch bezel and in a shape such as an elliptical ring using a center of the touchscreen of the watch as a center.

As shown in FIG. 1-a and FIG. 1-b, in a conventional technology, a user may use a finger to trigger a control instruction through tapping, sliding, or the like on a touchscreen of a smartwatch. Usually, an icon displayed on the touchscreen corresponds to one control point. Because the smartwatch has a relatively small touchscreen, a display user interface of the touchscreen corresponds to a relatively small quantity of control points. To trigger a control instruction, an icon corresponding to the control instruction that needs to be searched for can appear only after invoking a plurality of display user interfaces. An example is used in which a phone number of a designated contact is dialed. A trigger procedure includes: First, a telephony application program is found in an application program browsing interface. Then, the designated contact is found in a contact browsing interface corresponding to the telephony application program. Finally, the phone number of the designated contact is tapped to make a phone call. It may be understood that when there are a large quantity of application programs in the smartwatch, to find the telephony application program, a plurality of application program display user interfaces may need to be sequentially browsed. When there are a large quantity of contacts, to find the designated contact, a plurality of contact display user interfaces may need to be sequentially browsed. Therefore, in the prior art, when the smartwatch is controlled to search for a control instruction, a search path is relatively long, operations are complex, and a relatively long time is consumed. In addition, because the touchscreen of the smartwatch is usually relatively small, when an operation is performed on the touchscreen by using a finger, content displayed on the touchscreen is prone to be obscured by the finger, affecting the operation.

As shown in FIG. 1-c, in another conventional technology, a plurality of capacitive touch sensors are disposed around a watch face of a smartwatch. For example, the plurality of capacitive touch sensors may be disposed on a watch bezel, a lug, a watch strap, or another position on the watch. A control instruction is triggered by performing an operation on the capacitive touch sensor. One capacitive touch sensor is used as a control point to correspond to one instruction. Because a limited quantity of capacitive touch sensors may be disposed on the watch bezel, the lug, or the watch strap of the watch, a relatively small quantity of control points can be provided by using this method. Usually, when the smartwatch is controlled, a control instruction can be found only after a plurality of pressing operations. Therefore, operations are complex, and a relatively long time is consumed, reducing user experience.

Referring to FIG. 2-a1, FIG. 2-a1 is a schematic flowchart of a method for controlling a smartwatch according to an embodiment of the present invention. N capacitive touch sensors are disposed around a watch face of the smartwatch, and N is an integer greater than 1. As shown in FIG. 2-a1, the method for controlling a smartwatch may include the following steps.

101. Obtain a calibrated capacitance value of each capacitive touch sensor.

102. Determine a quantity of touch points based on maximum values of the calibrated capacitance values of the N capacitive touch sensors, where each touch point corresponds to one capacitive touch sensor.

It should be noted that a capacitance value of the capacitive touch sensor varies with a touch operation of a user. The calibrated capacitance value is a value obtained after preprocessing is performed on the capacitance value of the capacitive touch sensor. The calibrated capacitance value may be used to compare and calculate values of a plurality of capacitive touch sensors. Usually, when the user touches the capacitive touch sensor by using a finger, the capacitance value of the capacitive touch sensor increases. The capacitance threshold may be set. The maximum values of the calibrated capacitance values of the N capacitive touch sensors are compared with the preset capacitance threshold. A quantity of calibrated capacitance values that are in the calibrated capacitance values of the N capacitive touch sensors and whose maximum values are greater than the capacitance threshold is used as the quantity of touch points. Alternatively, it may be determined whether a calibrated capacitance value of a capacitive touch sensor is greater than the specified capacitance threshold, and whether the calibrated capacitance value is a maximum value when the calibrated capacitance Value is greater than the capacitance threshold. If a calibrated capacitance value of a capacitive touch sensor is greater than calibrated capacitance values of both capacitive touch sensors on the left side and the right side, the calibrated capacitance value of the capacitive touch sensor is a maximum value. For example, if calibrated capacitance values of successive capacitive touch sensors are 2053, 17334, and 3473 respectively, and the calibrated capacitance value of the second capacitive touch sensor is greater than the calibrated capacitance values of the two neighboring capacitive touch sensors, the calibrated capacitance value of the second capacitive touch sensor is a maximum value.

Specifically, when a calibrated capacitance value of a capacitive touch sensor is greater than the capacitance threshold and is a maximum value, it may be determined that the user touches the capacitive touch sensor. It may be understood that when a calibrated capacitance value of a capacitive touch sensor is less than or equal to the capacitance threshold, it may be determined that the user does not touch the capacitive touch sensor. For example, if the capacitance threshold is 8000, when a calibrated capacitance value of a capacitive touch sensor exceeds 8000 and is a maximum value, it is determined that the user touches the capacitive touch sensor. If a calibrated capacitance value of a capacitive touch sensor is less than or equal to 8000, it is determined that the user does not touch the capacitive touch sensor. It should be noted that the maximum value is a concept in narrow sense. The maximum value means that in a region, both function values on the left side and the right side are less than the value, while a greatest value means that in a region, all function values are less than the value.

It may be understood that the quantity of touch points may be determined based on a quantity of calibrated capacitance values of capacitive touch sensors that are greater than the capacitance threshold and that are maximum values. For example, if there is one capacitive touch sensor whose calibrated capacitance value is greater than the capacitance threshold, the calibrated capacitance value of the capacitive touch sensor is a maximum value, and there is one touch point. If there are two capacitive touch sensors whose calibrated capacitance values are greater than the capacitance threshold, and the calibrated capacitance values of the two capacitive touch sensors are maximum values, there are two touch points. If there are three capacitive touch sensors whose calibrated capacitance values are greater than the capacitance threshold, and the calibrated capacitance values of the three capacitive touch sensors are maximum values, there are three touch points. It should be noted that a maximum quantity of touch points at which the user performs a touch operation on the smartwatch simultaneously may alternatively be agreed. For example, when it is set that the user may perform a touch operation on the smartwatch simultaneously at a maximum of two touch points, if it is detected that there are three touch points, it may be determined that a false touch occurs, and this touch operation is not further responded. It may be understood that different touch instructions may alternatively be defined for operations at a plurality of touch points. Specifically, the touch instructions may be set according to a requirement.

103. Determine a location of each touch point based on a calibrated capacitance value of a capacitive touch sensor corresponding to the touch point and a calibrated capacitance value of a capacitive touch sensor neighboring to the capacitive touch sensor.

When the user touches the capacitive touch sensor by using a finger, if the finger touches different locations on the capacitive touch sensor, a capacitance value of a neighboring capacitive touch sensor changes. Therefore, the location of each touch point may be determined based on the calibrated capacitance value of the capacitive touch sensor corresponding to each touch point and the calibrated capacitance value of the neighboring capacitive touch sensor.

104. Execute a control instruction matching the quantity of touch points and the location of each touch point.

Specifically, the quantity of touch points and a control instruction corresponding to the location of each touch point may be preset. When the user performs an operation on a capacitive touch sensor on the smartwatch, if the quantity of touch points and the control instruction corresponding to the location of each touch point are preset, the control instruction matching the quantity of touch points and the location of each touch point is triggered.

In this embodiment of the present invention, the quantity of touch points and the location of the touch point may be determined by using a capacitance value of the capacitive touch sensor, and the control instruction matching the quantity of touch points and the location of each touch point may be executed. Compared with the prior art in which a smartwatch can only generate touch instructions whose quantity is the same as a quantity of capacitive touch sensors, in this embodiment of the present invention, one capacitive touch sensor may correspond to a plurality of touch instructions, and there may correspondingly be different touch instructions depending on different quantities and locations of touch points when a user touches a plurality of capacitive touch sensors. Therefore, according to this embodiment of the present invention, a quantity of control points in the smartwatch is increased, thereby helping shorten a path for searching for the control instruction in the smartwatch, simplify an operation procedure, and improve efficiency of operating the smartwatch.

In some possible implementations of the present invention, as shown in FIG. 2-a2, the obtaining a calibrated capacitance value of each capacitive touch sensor may be determined by using step 201 and step 202. Details are as follows:

201. Obtain a capacitance variation of each capacitive touch sensor, where the capacitance variation of the capacitive touch sensor is a capacitance value of the capacitive touch sensor minus an initial value of the capacitive touch sensor, and the initial value is a capacitance value of the capacitive touch sensor when a user does not touch the smartwatch.

In this embodiment of the present invention, all of a plurality of capacitive touch sensors may be connected to a capacitance measurement unit. The capacitance measurement unit may detect a capacitance value of each capacitive touch sensor.

The capacitance variation of each capacitive touch sensor is the capacitance value of the capacitive touch sensor that is detected by the capacitance measurement unit minus the initial value of the capacitive touch sensor.

202. Calibrate the obtained capacitance variation of each capacitive touch sensor, and use a value obtained by calibrating the capacitance variation of each capacitive touch sensor as the calibrated capacitance value of the capacitive touch sensor.

It should be noted that due to different structures, placement locations, or the like of capacitive touch sensors, capacitance values of the capacitive touch sensors may respond to a touch operation of the user inconsistently. To determine a touch location of the user by using the capacitance value of the capacitive touch sensor, the capacitance variation of each capacitive touch sensor needs to be calibrated. The calibrated capacitance value obtained through calibration may be used to determine a location of a touch operation and the quantity of touch points.

It should be noted that step 203 to step 205 in FIG. 2-*a2* are the same as step 102 to step 104 in FIG. 2-*a1*. For details, refer to the foregoing descriptions, and details are not described again.

In some possible implementations of the present invention, as shown in FIG. 2-*b*, step 202 may include the following steps.

2021. Determine a calibration coefficient K(i) of a capacitive touch sensor i based on a maximum capacitance variation that can be reached by the capacitive touch sensor i, where the capacitive touch sensor i is any one of the N capacitive touch sensors, and $0 \le i \le N-1$.

In some possible implementations of the present invention, as shown in FIG. 2-*c*, step 2021 may include the following steps.

20211. Obtain the maximum capacitance variation MAX_DEL_CDC(i) that can be reached by the capacitive touch sensor i.

A maximum capacitance value may be obtained after the finger of the user fully comes into contact with each capacitive touch sensor. For example, the maximum capacitance value may be obtained in the following manner: If N=12, the finger of the user quickly slides repeatedly on surfaces of the 12 capacitive touch sensors, and a maximum detection value that can be reached by each capacitive touch sensor is used as the maximum capacitance value.

For example, if 12 arc-shaped capacitive touch sensors (which are capacitive touch sensor 0, capacitive touch sensor 1, capacitive touch sensor 2, capacitive touch sensor 3, capacitive touch sensor 4, capacitive touch sensor 5, capacitive touch sensor 6, capacitive touch sensor 7, capacitive touch sensor 8, a capacitive touch sensor 9, capacitive touch sensor 10, and capacitive touch sensor 11) defining a circular ring are evenly disposed on a watch bezel of the watch, maximum capacitance variations MAX_DEL_CDC(i) of the capacitive touch sensors that are measured by the capacitance measurement unit are shown by a curve in FIG. 2-*e*. Specifically, the maximum capacitance variations of capacitive touch sensor 0 to capacitive touch sensor 11 are 26520, 29632, 29325, 28826, 22503, 14576, 20465, 22053, 17334, 23473, 22481, and 32795 respectively.

20212. Calculate an average value AVG_DEL_CDC of maximum capacitance variations of the N capacitive touch sensors, where $$\text{AVG\_DEL\_CDC} = \frac{\sum_{j=0}^{N-1} \text{MAX\_DEL\_CDC}(j)}{N}.$$

Using descriptions in step 20211 as an example, $$\text{AVG\_DEV\_CDC} = \frac{\sum_{i=0}^{N-1} \text{MAX\_DEL\_CDC}(i)}{N} =$$

$(26520 + 29632 + 29325 + 28826 + 22503 + 14576 + 20465 + 22053 + 17334 + 23473 + 22481 + 32795)/12 = 24165.25$

20213. Use, as the calibration coefficient K(i) of the capacitive touch sensor i, a ratio of the average value of the maximum capacitance variations of the N capacitive touch sensors to the maximum capacitance variation that can be reached by the capacitive touch sensor i, that is, $$K(i) = \frac{\text{AVG\_DEL\_CDC}}{\text{MAX\_DEL\_CDC}(i)}.$$

Using descriptions in step 20211 and step 20212 as an example, according to the foregoing formula, calibration coefficients K(i) of capacitive touch sensor 0 to capacitive touch sensor 11 are respectively:

$$K(0) = \frac{24165.25}{26520} = 0.91, K(1) = \frac{24165.25}{29632} = 0.82,$$

$$K(2) = \frac{24165.25}{29325} = 0.82, K(3) = \frac{24165.25}{28826} = 0.84,$$

$$K(4) = \frac{24165.25}{22503} = 1.07, K(5) = \frac{24165.25}{14576} = 1.66,$$

$$K(6) = \frac{24165.25}{20465} = 1.18, K(7) = \frac{24165.25}{22053} = 1.1,$$

$$K(8) = \frac{24165.25}{17334} = 1.39, K(9) = \frac{24165.25}{23473} = 1.03,$$

$$K(10) = \frac{24165.25}{22481} = 1.07, K(11) = \frac{24165.25}{32795} = 0.74$$

2022. Multiply a capacitance variation DEL of the capacitive touch sensor i by the calibration coefficient K(i) corresponding to the capacitive touch sensor i, to obtain a calibrated capacitance value CDC(i) of the capacitive touch sensor i, where CDC(i)=DEL_CDC(i)*K(i).

For example, if DEL_CDC(i)=26520, and K(i)=0.91, $CDC(i)=DEL\_CDC(i)*K(i)=24133.2.$ In some possible implementations of the present invention, step 204 of determining a location of each touch point based on a calibrated capacitance value of a capacitive touch sensor corresponding to the touch point and a calibrated capacitance value of a capacitive touch sensor neighboring to the capacitive touch sensor shown in FIG. 2-*a2* may include:

determining a circumferential angle P of each touch point based on a calibrated capacitance value of a capacitive touch sensor corresponding to the touch point and a calibrated capacitance value of a neighboring capacitive touch sensor, where using a center point of a display user interface of the smartwatch as a start point and using an angle corresponding to a ray horizontally extending rightward from the start point as 0°, the circumferential angle P is an angle by which the ray rotates around the start point in a counterclockwise direction to the touch point.

In some possible implementations of the present invention, as shown in FIG. 2-*d*, step 205 of executing a control instruction matching the quantity of touch points and the location of each touch point shown in FIG. 2-*a2* may include the following steps.

2051. Determine, according to a preset mapping rule, a mapping point corresponding to a circumferential angle P of a first touch point, where the mapping point corresponds to an application displayed in a display user interface of the smartwatch, and the first touch point is any touch point.

2052. Execute a control instruction that is for the application corresponding to the mapping point and that matches the quantity of touch points and the circumferential angle of each touch point.

In some possible implementations of the present invention, the mapping point corresponding to the circumferential angle of the first touch point may be determined based on a location of the application displayed on the display user interface of the smartwatch, a geometric shape defined by the N capacitive touch sensors, and the circumferential angle of the first touch point.

For example, if each of the N capacitive touch sensors is in a circular arc shape, the N capacitive touch sensors define a circular ring, a radius of an inner circle of the circular ring is r, coordinates of a circle center are (a, b), an origin of a Cartesian coordinate system is in an upper left corner of the inner circle of the circular ring, the horizontal coordinate is tangent to the inner circle of the circular ring horizontally rightward, the vertical coordinate is tangent to the inner circle of the circular ring vertically downward, and a center point of an icon of each application that is displayed on the display user interface of the smartwatch is located on a circular contour using (a, b) as a circle center and $r_1$ as a radius, then coordinates of the mapping point corresponding to the circumferential angle P of the first touch point may be (x, y), where $x=a+r_1*\cos(P)$, $y=b-r_1*\sin(P)$, and $0<r_1 \leq r$.

Using FIG. 2-*f* as an example, the watch face X1 of the watch is circular, and a watch bezel X2 located around the watch face X1 of the watch is a circular ring. 12 capacitive touch sensors X3 (which are capacitive touch sensor 0, capacitive touch sensor 1, capacitive touch sensor 2, capacitive touch sensor 3, capacitive touch sensor 4, capacitive touch sensor 5, capacitive touch sensor 6, capacitive touch sensor 7, capacitive touch sensor 8, capacitive touch sensor 9, capacitive touch sensor 10, and capacitive touch sensor 11 respectively) in a circular arc shape are evenly disposed on the watch bezel. That is, the 12 capacitive touch sensors define a circular ring. A radius of an inner circle of the circular ring is 200, and a circle center is (200, 200). The user touches an edge of capacitive touch sensor 4 on the watch bezel by using a single finger. If it is calculated that a circumferential angle P of a touch point is 150°, the foregoing touch operation in which the circumferential angle is 150° may be mapped to a point on a surface of the watch. For example, coordinates of a mapping point may be (x, y), where $x=200+r_1*\cos(150°)$, $y=200-r_1*\sin(150°)$, and $0<r_1 \leq r$. If $r_1=200$, $x=27$ and $y=100$. If (27,100) is covered by an icon of an application A, it may be set that the touch operation of the user is an operation for the application A, for example, may be opening the application A or moving the icon of the application A. The touch operation may be specifically set according to a requirement.

It should be noted that the display user interface, that is, the touchscreen, of the watch face shown in FIG. 1-*b* includes a plurality of circular application icons distributed in a circular ring. If a radius from a center of each application icon to a center of the watch face is 100, $r_1$ may be 100. That is, the touch operation in which the circumferential angle P is 150° is mapped to a point (200+100*cos 150°, 200-100*sin 150°), namely, a point (113, 150). If the circumferential angle P is 145°, the touch operation may be mapped to a point (200+100*cos 145°, 200-100*sin 145°), namely, a point (118, 143). If the circumferential angle P is 140°, the touch operation may be mapped to a point (200+ 100*cos 140°, 200-100*sin 140°), namely, a point (123, 136).

It may be understood that when a touch operation is performed at different locations on a same touch sensor, there may correspondingly be different mapping points on the watch face. Corresponding operations may be preset for different mapping points. Compared with the prior art in which one capacitive touch sensor can correspond to only one operation, in this embodiment of the present invention, a quantity of control points in the smartwatch can be increased, thereby shortening a path for searching for a control instruction in the smartwatch. For example, if an icon of the 50$^{th}$ application software is searched for from an icon of application software numbered 1, and icons of 12 pieces of application software may be displayed at once on the watch face while icons of other application software are hidden, the icon of the application software may be located by using a sliding operation. In the prior art, one touch sensor corresponds to one shift instruction, if the icon of the 50$^{th}$ application software is to be located, the user needs to slide with at least four circles on the watch face. According to this embodiment, if 5° corresponds to one shift instruction, the user can find, by sliding with less than one circle on the watch face, the icon of the application software that needs to be located, to locate the icon of the 50$^{th}$ application software. Therefore, according to this embodiment of the present invention, a control point in the smartwatch can be increased, thereby helping shorten a path for searching for the control instruction in the smartwatch, simplify an operation procedure, and improve efficiency of operating the smartwatch.

It should be noted that the circumferential angle P of the touch point may be obtained in the following manner: If each of the N capacitive touch sensors is in a circular arc shape, the N capacitive touch sensors define a circular ring or an elliptical ring, and a circumferential angle of a touch point located on a capacitive touch sensor k is P, $$P = APS*((k-1+N)\% \ N) + \frac{APS*[CDC((k-1+N)\% \ N)*1 + CDC(k)*2 + CDC((k+1+N)\% \ N)*3]}{CDC((k-1+N)\% \ N) + CDC(k) + CDC((k+1+N)\% \ N)}$$

where $0 \leq k \leq N-1$, APS is a value of a circumferential angle corresponding to one capacitive touch sensor, that is, APS=360/N, % is a modulo operator, the N capacitive touch sensors are sequentially numbered 0 to NI counterclockwise, and capacitive touch sensor 0 is the first capacitive touch sensor that is disposed horizontally upward and that is located on a right side of the center point of the display user interface of the smartwatch.

Using the single-finger operation shown in FIG. 2-*f* as an example, if calibrated capacitance values of capacitive touch sensor 0 to capacitive touch sensor 11 are 32.76, 47.56, 9.84, 10.92, 16353.88, 8680.14, 840.16, 733.7, 36.14, 14.42, 19.26, and 14.8 respectively shown in FIG. 3, and the preset capacitance threshold is 8000, it can be learned from FIG. 3 that only the calibrated capacitance value 16353.88 of capacitive touch sensor 4 is greater than the capacitance threshold and is a maximum value. In this case, it may be determined that there is one touch point. That is, there is a single-finger operation on the capacitive touch sensor numbered 4.

Further, a circumferential angle P corresponding to the single-finger operation may be determined according to the following formula:

$$P = APS * ((k-1+N)\% \ N) +$$
$$\frac{APS * [CDC((k-1+N)\% \ N) * 1 + CDC(k) * 2 + CDC((k+1+N)\% \ N) * 3]}{CDC((k-1+N)\% \ N) + CDC(k) + CDC((k+1+N)\% \ N)}$$

where $k = 4$, $APS = 360/12 = 30°$, and $$P = 30° * 3 + 30° * (10.92 * 1 + 1635.88 * 2 + 8680.14 * 3)/$$
$$(10.92 + 16353.88 + 8680.14) = 150.38°.$$

Figure 4:
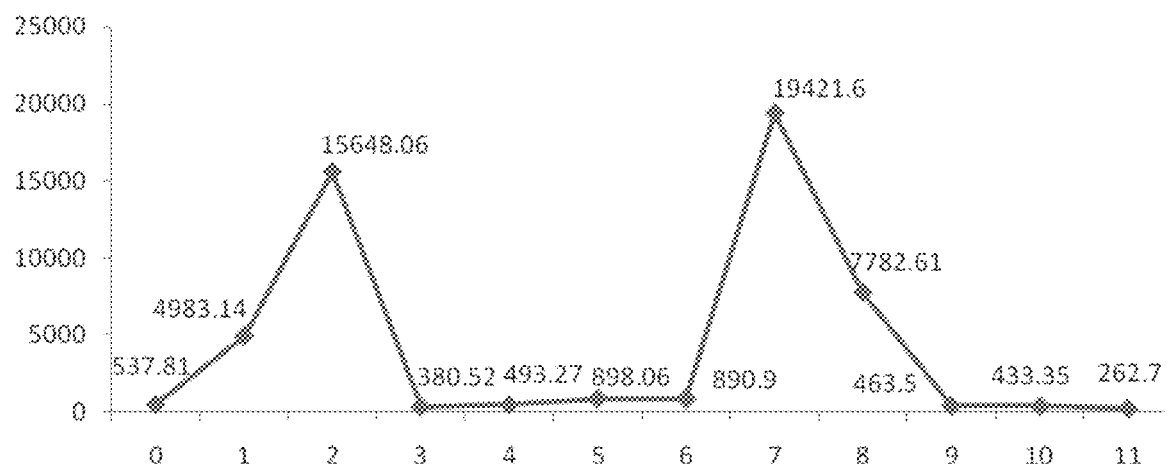
FIG. 4 is a schematic diagram of a calibrated capacitance value of each capacitive touch sensor according to an embodiment of the present invention.

If the calibrated capacitance Values of capacitive touch sensor 0 to capacitive touch sensor 11 are shown in FIG. 4, and are 537.81, 4983.14, 15648.06, 380.52, 493.27, 898.06, 890.9, 19421.6, 7782.61, 463.5, 433.35, and 262.7 respectively, if the preset capacitance threshold is 8000, it can be learned from FIG. 4 that the calibrated capacitance values 15648.06 and 19421.6 of capacitive touch sensor 2 and capacitive touch sensor 7 are greater than the capacitance threshold 8000 and are maximum values. In this case, it may be determined that there are two touch points. That is, there is a double-finger operation on the capacitive touch sensors numbered 2 and 7.

Further, a circumferential angle P1 corresponding to a first finger may be determined according to the following formula:

$$P1 = APS * ((k-1+N)\% \ N) +$$
$$\frac{APS * [CDC((k-1+N)\% \ N) * 1 + CDC(k) * 2 + CDC((k+1+N)\% \ N) * 3]}{CDC((k-1+N)\% \ N) + CDC(k) + CDC((k+1+N)\% \ N)}$$

where $k = 2$, $APS = 360/12 = 30°$, and $$P1 = 30° * 1 + 30° * (4983.14 * 1 + 15648.06 * 2 + 380.52 * 3)/$$
$$(4983.14 + 15648.06 + 380.52) = 83.43°.$$

If there are 72 control points on a circumference, the circumference is divided into arc lengths each corresponding to a circumferential angle of 5°. It should be noted that if a calculated circumferential angle corresponding to a control point is not a multiple of 5°, the circumferential angle corresponding to the touch point is determined according to a principle of proximity. For example, if the calculated circumferential angle is and neighboring circumferential angles are 20° and 25°, because 23.1° is closer to 25°, 25° is used as the circumferential angle corresponding to the touch point. It may be understood that when the circumferential angle is determined, if the circumferential angle is not a multiple of 5°, an angle closest to a multiple of 5° and less than the obtained circumferential angle may be used. Certainly, an angle closest to a multiple of 5° and greater than the obtained circumferential angle may alternatively be used. According to the principle of proximity, 85° is used as a value of P1.

If a preset mapping rule between the circumferential angle P1 and a mapping point (x1, y1) is
x1=a+r*cos(P1), r*cos(P1), and y1=b−r*sin(P1),
x1=a+r*cos(P1)=200+200*cos(85°)=200+17=217, and
y1=b−r*sin(P1)=200−200*sin(85°)=200+199=1.

That is, the mapping point of the circumferential angle P1 is (217, 1).

A circumferential angle P2 corresponding to a second finger may be determined according to the following formula:

$$P2 = APS * ((k-1+N)\% \ N) +$$
$$\frac{APS * [CDC((k-1+N)\% \ N) * 1 + CDC(k) * 2 + CDC((k+1+N)\% \ N) * 3]}{CDC((k-1+N)\% \ N) + CDC(k) + CDC((k+1+N)\% \ N)}$$

where $k = 7$, $APS = 360/12 = 30°$, and $$P2 = 30° * 6 + 30° * (890.9 * 1 + 19421.6 * 2 + 778261 * 3)/$$
$$(890.9 + 19421.6 + 7782.61) = 247.36°.$$

If there are 72 coordinate points on the circumference, the circumference is divided into arc lengths each corresponding to a circumferential angle of 5°. According to the principle of proximity, 245° is used as a value of P2.

If a preset mapping rule between the circumferential angle P2 and a mapping point (x2, y2) is
x2=a+r*cos(P1), r*cos(P1), and y2=b−r*sin(P1),
x2=a+r*cos(P2)=200+200*cos(245°)=200−84=116, and
y2=b−r*sin(P2)=200+200*sin(245°)=200+181=381.

That is, the mapping point of the circumferential angle P2 is (116, 381).

In an embodiment of the present invention, a watch face Y2, a watch bezel Y3, and a capacitive touch sensor Y4 disposed on the watch bezel Y3 that are of a smartwatch Y1 are shown in FIG. 5. The watch face Y2 and the watch bezel Y3 are elliptical, center coordinates of an ellipse are (160, 200), a major radius is 200, a minor radius is 160, there are 72 control points on a circumference, and the circumference is divided into arc lengths each corresponding to a circumferential angle of 5°. It should be noted that if a calculated circumferential angle corresponding to a control point is not a multiple of 5°, the circumferential angle corresponding to the touch point is determined according to a principle of proximity. For example, if the calculated circumferential angle is 23.1°, and neighboring circumferential angles are 20° and 25°, because 23.1° is closer to 25°, 25° is used as the circumferential angle corresponding to the touch point if a value is used according to the principle of proximity.

If calibrated capacitance values of capacitive touch sensor 0 to capacitive touch sensor 11 in FIG. 5 are shown in FIG. 4, and are 537.81, 4983.14, 15648.06, 380.52, 493.27, 898.06, 890.9, 19421.6, 7782.61, 463.5, 433.35, and 262.7 respectively, if the preset capacitance threshold is 8000, it can be learned from FIG. 4 that the calibrated capacitance values 15648.06 and 19421.6 of capacitive touch sensor 2 and capacitive touch sensor 7 are greater than the capacitance threshold 8000 and are maximum values. In this case, it may be determined that there are two touch points. That is, there is a double-finger operation on the capacitive touch sensors numbered 2 and 7, where the two fingers include a first finger and a second finger.

Further, a circumferential angle P3 corresponding to the first finger may be determined according to the following formula:

$$P3 = APS * ((k-1+N)\% \ N) +$$
$$\frac{APS * [CDC((k-1+N)\% \ N) * 1 + CDC(k) * 2 + CDC((k+1+N)\% \ N) * 3]}{CDC((k-1+N)\% \ N) + CDC(k) + CDC((k+1+N)\% \ N)}$$

where $k = 2$, $APS = 360/12 = 30°$, and $$P3 = 30° * 1 + 30° * (4983.14 * 1 + 15648.06 * 2 + 380.52 * 3)/$$
$$(4983.14 + 15648.06 + 380.52) = 83.43°.$$

According to the principle of proximity, 85° is used as a value of P3.

If a preset mapping rule between the circumferential angle P3 and a mapping point (x3, y3) is x3=a+sr*cos(P3) and y3=b−lr*sin(P3), x3=a+sr*cos(P3)=160+160*cos(85°)=16+14=174, and
y3=b−lr*sin(P3)=200−200*sin(85°)=200+199=1.

That is, the mapping point of the circumferential angle P3 is (174, 1).

A circumferential angle P4 corresponding to the second finger may be determined according to the following formula:

$$P4 = APS*((k-1+N)\% \ N) +$$

$$\frac{APS*[CDC((k-1+N)\% \ N)*1 + CDC(k)*2 + CDC((k+1+N)\% \ N)*3]}{CDC((k-1+N)\% \ N) + CDC(k) + CDC((k+1+N)\% \ N)}$$

where $k = 7$, $APS = 360/12 = 30°$, and $$P4 = 30°*6 + 30°*(890.9*1 + 19421.6*2 + 7782.61*3)/$$

$$(890.9 + 19421.6 + 7782.61) = 247.36°.$$

According to the principle of proximity, 245° is used as a value of P4.

If a preset mapping rule between the circumferential angle P4 and a mapping point (x4, y4) is x4=a+sr*cos(P4) and y4=b−lr*sin(P4), x4=a+sr*cos(P4)=160+160*cos(245°)=160−68=82, and
y4=b−lr*sin(P4)=200−200*sin(245°)=200+181=381.

That is, the mapping point of the circumferential angle P4 is (82, 381).

It may be understood that in this embodiment of the present invention, the quantity of touch points may be determined. Therefore, based on the quantity of touch points, there may correspondingly be a single-finger operation, a double-finger operation, a multi-finger operation, a false operation, or the like in an actual operation. In addition, with the help of a time point of a touch operation, for example, if single operations are intermittently detected at a same location within 200 milliseconds, it may be determined that the user performs a double-tap operation on a same mapping point. Specified operation instructions may be triggered for mapping points at different locations according to an actual operation requirement.

In this embodiment of the present invention, the quantity of touch points and the location of the touch point may be determined by using a capacitance value of the capacitive touch sensor, and the control instruction matching the quantity of touch points and the location of each touch point may be executed. Compared with the prior art in which a smartwatch can only generate touch instructions whose quantity is the same as a quantity of capacitive touch sensors, in this embodiment of the present invention, one capacitive touch sensor may correspond to a plurality of touch instructions, and different touch instructions may be executed based on different quantities and locations of touch points when a user touches a plurality of capacitive touch sensors. Therefore, according to this embodiment of the present invention, a quantity of control points in the smartwatch is increased, thereby helping shorten a path for searching for the control instruction in the smartwatch, simplify an operation procedure, and improve efficiency of operating the smartwatch.

Figure 6:
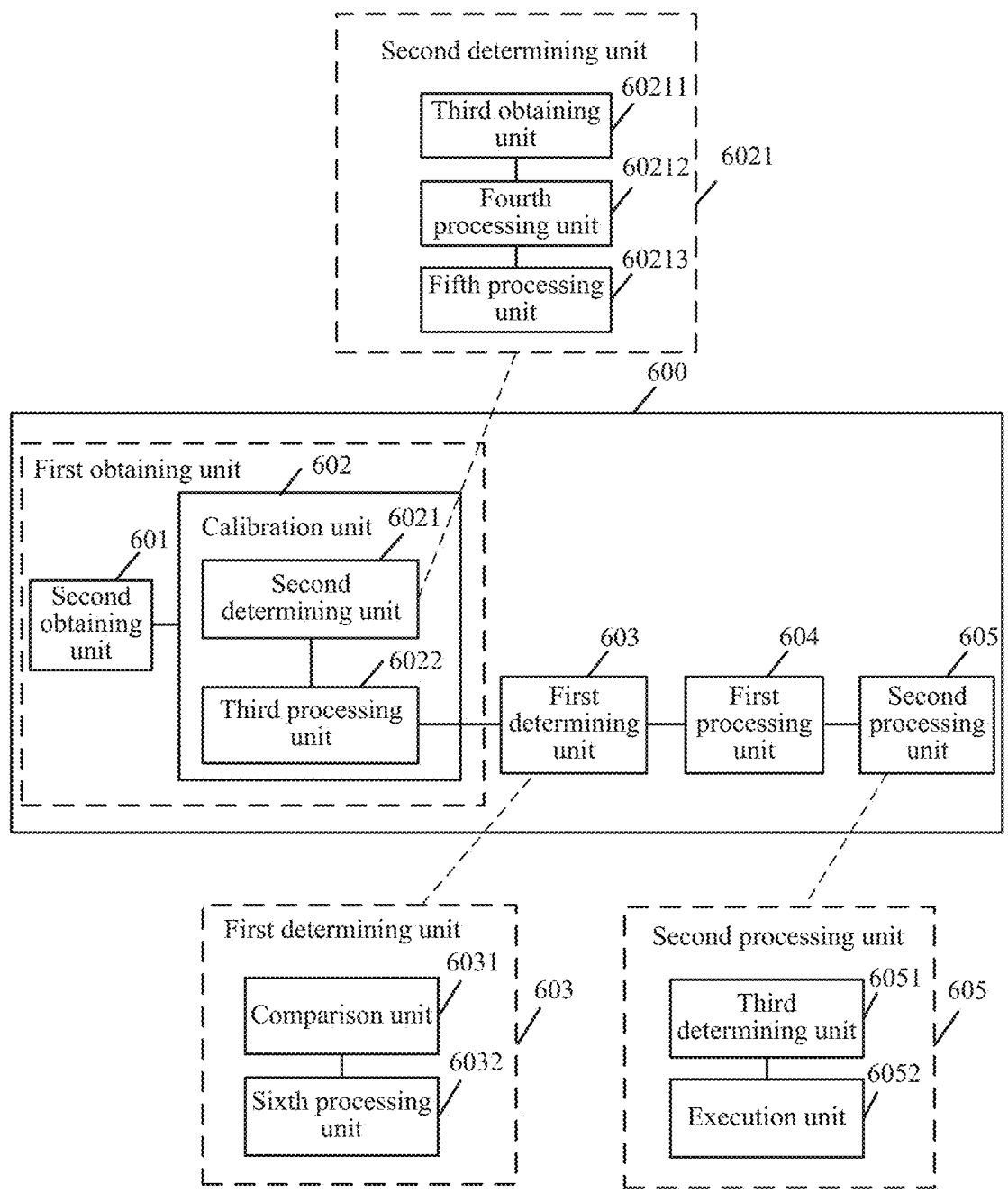
FIG. 6-a is a schematic structural diagram of a smartwatch according to an embodiment of the present invention.

Referring to FIG. 6-a, FIG. 6-a shows a smartwatch according to an embodiment of the present invention. Specifically, N capacitive touch sensors are disposed around a watch face of the smartwatch 600 shown in FIG. 6-a, where N is an integer greater than 1. The smartwatch 600 may further include a first obtaining unit, a first determining unit 603, a first processing unit 604, and a second processing unit 605.

The first obtaining unit is configured to obtain a calibrated capacitance value of each capacitive touch sensor, and is configured to perform the method in step 101 in FIG. 2-a1 in the method embodiment of the present invention. For an implementation of the first obtaining unit, refer to corresponding descriptions in step 101 in FIG. 2-a1 in the method embodiment of the present invention, and details are not described herein again.

The first determining unit 603 is configured to perform the method in step 102 in FIG. 2-a1 in the method embodiment of the present invention. For an implementation of the first determining unit 603, refer to corresponding descriptions in step 102 in FIG. 2-a1 in the method embodiment of the present invention, and details are not described herein again.

The first processing unit 604 is configured to perform the method in step 103 in FIG. 2-a1 in the method embodiment of the present invention. For an implementation of the first processing unit 604, refer to corresponding descriptions in step 103 in FIG. 2-a1 in the method embodiment of the present invention, and details are not described herein again.

The second processing unit 605 is configured to perform the method in step 104 in FIG. 2-a1 in the method embodiment of the present invention. For an implementation of the second processing unit 605, refer to corresponding descriptions in step 104 in FIG. 2-a1 in the method embodiment of the present invention, and details are not described herein again.

It should be noted that, to obtain the calibrated capacitance value of the capacitive touch sensor, the first obtaining unit in the smartwatch 600 may include a second obtaining unit 601 and a calibration unit 602.

The second obtaining unit 601 is configured to perform the method in step 201 in FIG. 2-a2 in the method embodiment of the present invention. For an implementation of the second obtaining unit 601, refer to corresponding descriptions in step 201 in FIG. 2-a2 in the method embodiment of the present invention, and details are not described herein again.

The calibration unit 602 is configured to perform the method in step 202 in FIG. 2-a2 in the method embodiment of the present invention. For an implementation of the calibration unit 602, refer to corresponding descriptions in step 202 in FIG. 2-a2 in the method embodiment of the present invention, and details are not described herein again.

Optionally, in some possible implementations of the present invention, as shown in FIG. 6-b, the calibration unit 602 may include a second determining unit 6021 and a third processing unit 6022.

The second determining unit 6021 is configured to perform the method in step 2021 in FIG. 2-b in the method embodiment of the present invention. For an implementation of the second determining unit 6021, refer to corresponding descriptions in step 2021 in FIG. 2-b in the method embodiment of the present invention, and details are not described herein again.

The third processing unit 6022 is configured to perform the method in step 2022 in FIG. 2-b in the method embodiment of the present invention. For an implementation of the third processing unit 6022, refer to corresponding descriptions in step 2022 in FIG. 2-*b* in the method embodiment of the present invention, and details are not described herein again.

Optionally, in some possible implementations of the present invention, as shown in FIG. 6-*b*, the second determining unit 6021 may include a third obtaining unit 60211, a fourth processing unit 60212, and a fifth processing unit 60213.

The third obtaining unit 60211 is configured to perform the method in step 20211 in FIG. 2-*c* in the method embodiment of the present invention. For an implementation of the third obtaining unit 60211, refer to corresponding descriptions in step 20211 in FIG. 2-*c* in the method embodiment of the present invention, and details are not described herein again.

The fourth processing unit 60212 is configured to perform the method in step 20212 in FIG. 2-*c* in the method embodiment of the present invention. For an implementation of the fourth processing unit 60212, refer to corresponding descriptions in step 20212 in FIG. 2-*c* in the method embodiment of the present invention, and details are not described herein again.

The fifth processing unit 60213 is configured to perform the method in step 20213 in FIG. 2-*c* in the method embodiment of the present invention. For an implementation of the fifth processing unit 60213, refer to corresponding descriptions in step 20213 in FIG. 2-*c* in the method embodiment of the present invention, and details are not described herein again.

Optionally, in some possible implementations of the present invention, as shown in FIG. 6-*b*, the first determining unit 603 may include a comparison unit 6031 and a sixth processing unit 6032.

The comparison unit 6031 is configured to compare maximum values of the calibrated capacitance values of the N capacitive touch sensors with a preset capacitance threshold.

The sixth processing unit 6032 is configured to use a quantity of calibrated capacitance values that are in the calibrated capacitance values of the N capacitive touch sensors and whose maximum values are greater than the capacitance threshold as a quantity of touch points.

Optionally, in some possible implementations of the present invention, the first processing unit 604 is specifically configured to determine a circumferential angle P of each touch point based on a calibrated capacitance value of a capacitive touch sensor corresponding to the touch point and a calibrated capacitance value of a capacitive touch sensor neighboring to the capacitive touch sensor, where using a center point of a display user interface of the smartwatch as a start point and using an angle corresponding to a ray horizontally extending rightward from the start point as 0°, the circumferential angle P is an angle by which the ray rotates around the start point in a counterclockwise direction to the touch point.

Optionally, in some possible implementations of the present invention, as shown in FIG. 6-*b*, the second processing unit 605 may include a third determining unit 6051 and an execution unit 6052.

The third determining unit 6051 is configured to perform the method in step 2051 in FIG. 2-*d* in the method embodiment of the present invention. For an implementation of the third determining unit 6051, refer to corresponding descriptions in step 2051 in FIG. 2-*d* in the method embodiment of the present invention, and details are not described herein again.

The execution unit 6052 is configured to perform the method in step 2052 in FIG. 2-*d* in the method embodiment of the present invention. For an implementation of the execution unit 6052, refer to corresponding descriptions in step 2052 in FIG. 2-*d* in the method embodiment of the present invention, and details are not described herein again.

Optionally, in some possible implementations of the present invention, the third determining unit 6051 may be specifically configured to determine, based on a location of an application displayed on the display user interface of a touchscreen of the smartwatch, a geometric shape defined by the N capacitive touch sensors, and a circumferential angle of the first touch point, a mapping point corresponding to the circumferential angle of the first touch point.

Optionally, in some possible implementations of the present invention, the first processing unit 604 may be specifically configured to: if each of the N capacitive touch sensors is in a circular arc shape, the N capacitive touch sensors define a circular ring or an elliptical ring, and a circumferential angle of a touch point located on a capacitive touch sensor k is P.

$$P = APS*((k-1+N)\%\ N) + \frac{APS*[CDC((k-1+N)\%\ N)*1 + CDC(k)*2 + CDC((k+1+N)\%\ N)*3]}{CDC((k-1+N)\%\ N) + CDC(k) + CDC((k+1+N)\%\ N)}$$

where $0 \leq k \leq N-1$, APS is a value of a circumferential angle corresponding to one capacitive touch sensor, that is, APS=360/N, % is a modulo operator, the N capacitive touch sensors are sequentially numbered 0 to N−1 counterclockwise, and capacitive touch sensor 0 is the first capacitive touch sensor that is disposed horizontally upward and that is located on a right side of the center point of the display user interface of the smartwatch.

Optionally, in some possible implementations of the present invention, the third determining unit 6051 may be specifically configured to: if each of the N capacitive touch sensors is in a circular arc shape, the N capacitive touch sensors define a circular ring, a radius of an inner circle of the circular ring is r, coordinates of a circle center are (a, b), an origin of a Cartesian coordinate system is in an upper left corner of the inner circle of the circular ring, the horizontal coordinate is tangent to the inner circle of the circular ring horizontally rightward, the vertical coordinate is tangent to the inner circle of the circular ring vertically downward, and a center point of an icon of each application that is displayed on the display user interface of the smartwatch is located on a circular contour using (a, b) as a circle center and $r_1$ as a radius, then coordinates of the mapping point corresponding to the circumferential angle P of the first touch point are (x, y), where $x = a + r_1 * \cos(P)$, $y = b - r_1 * \sin(P)$, and $0 < r_1 \leq r$.

Optionally, in some possible implementations of the present invention, the third determining unit 6051 may be specifically configured to: if each of the N capacitive touch sensors is in a circular arc shape, the N capacitive touch sensors define an elliptical ring, coordinates of a center point of the elliptical ring are (a, b), a major radius of an inner ellipse of the elliptical ring is Lr, a minor radius is Sr, a center point of an icon of each application that is displayed on the display user interface of the smartwatch is located on an elliptical contour using (a, b) as a center point, Lr' as a major radius, and Sr' as a minor radius, $0 < Lr' \leq Lr$, and $0 < Sr' \leq Sr$, then coordinates of the mapping point corresponding to the circumferential angle P of the first touch point are (x, y), where x=a+Sr'*cos(P), y=b−Lr'*sin(P), the major radii Lr and Lr' are oriented vertically, and the minor radii Sr and Sr' are oriented horizontally.

In this embodiment of the present invention, the quantity of touch points and the location of the touch point may be determined by using a capacitance value of the capacitive touch sensor, and the smartwatch may be controlled to execute the control instruction matching the quantity of touch points and the location of each touch point. Compared with the prior art in which a smartwatch can only generate touch instructions whose quantity is the same as a quantity of capacitive touch sensors, in this embodiment of the present invention, one capacitive touch sensor may correspond to a plurality of touch instructions, and there may correspondingly be different touch instructions depending on different quantities and locations of touch points when a user touches a plurality of capacitive touch sensors. Therefore, according to this embodiment of the present invention, a quantity of control points in the smartwatch is increased, thereby helping shorten a path for searching for the control instruction in the smartwatch, simplify an operation procedure, and improve efficiency of operating the smartwatch.

Figure 7:
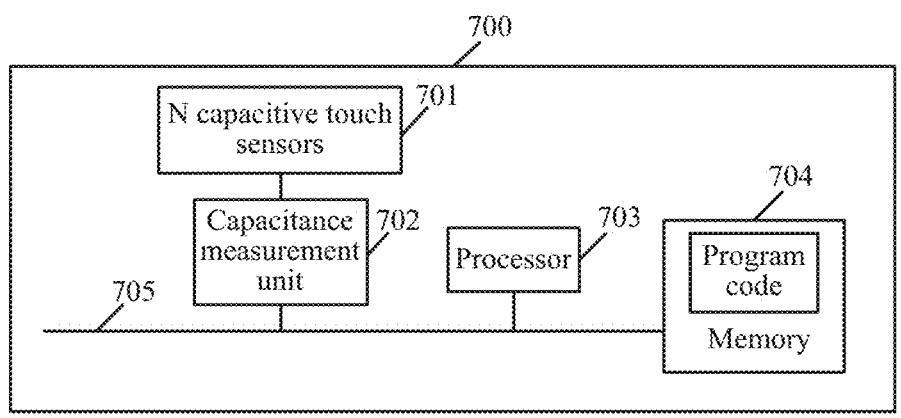
FIG. 7 is a schematic structural diagram of a smartwatch according to an embodiment of the present invention.

Referring to FIG. 7, FIG. 7 shows a smartwatch 700 according to an embodiment of the present invention. The smartwatch 700 may include:

N capacitive touch sensors 701, a capacitance measurement unit 702, a processor 703, a memory 704, and a bus 705, where N is an integer greater than 1.

The N capacitive touch sensors 701 are connected to the capacitance measurement unit 702. The capacitance measurement unit 702, the processor 703, and the memory 704 are coupled to each other by using the bus 05.

The memory 704 is configured to store computer-executable program code. The executable program code includes an instruction. When the processor 703 executes the instruction, the instruction causes the smartwatch to perform the method according to the method embodiment of the present invention. For the method, refer to the method including step 101 to step 104 in FIG. 2-*a*1, the method including step 201 to step 205 in FIG. 2-*a*2, the method including step 2021 and step 2022 in FIG. 2-*b*, the method including step 20211 to step 20213 in FIG. 2-*c*, or the method including step 2051 and step 2052 in FIG. 2-*d*, and descriptions corresponding to an execution process of the smartwatch in the method embodiment, and details are not described herein again.

Based on a same inventive concept, a principle of resolving a problem by the smartwatch provided in this embodiment of the present invention is similar to that in the method for controlling a smartwatch in the method embodiment of the present invention. Therefore, for implementation of the smartwatch, refer to implementation of the foregoing method. For brevity, details are not described herein again.

In this embodiment of the present invention, the quantity of touch points and the location of the touch point may be determined by using a capacitance value of the capacitive touch sensor, and the control instruction matching the quantity of touch points and the location of each touch point may be triggered. Compared with the prior art in which a smartwatch can only generate touch instructions whose quantity is the same as a quantity of capacitive touch sensors, in this embodiment of the present invention, one capacitive touch sensor may generate a plurality of touch instructions, and different touch instructions may be generated based on different quantifies and locations of touch points when a user touches a plurality of capacitive touch sensors. Therefore, according to this embodiment of the present invention, a quantity of control points in the smartwatch is increased, thereby helping shorten a path for searching for the control instruction in the smartwatch, simplify an operation procedure, and improve efficiency of operating the smartwatch.

An embodiment of the present invention further provides a computer storage medium. The computer storage medium may store a program. When executed, the program includes all or some of the steps of any method for controlling a smartwatch described in the foregoing method embodiments.

In the foregoing embodiments, the description of each embodiment has respective focuses. For a part that is not described in detail in an embodiment, reference may be made to related descriptions in other embodiments.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

In the several embodiments provided in the present application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, and may be specifically a processor in a computer device) to perform all or a part of the steps of the foregoing methods described in the embodiments of the present invention. The foregoing storage medium includes: any medium that can store program code, such as a USB flash drive, a removable hard disk, a magnetic disk, an optical disc, a read-only memory (ROM, Read-Only Memory), or a random access memory (RAM, Random Access Memory).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for controlling a smartwatch, wherein the smartwatch comprises a screen and has N capacitive touch sensors disposed around the screen, wherein the N is an integer greater than one, and wherein the method comprises:
receiving a touch on the screen in association with a subset of the N capacitive touch sensors;
obtaining one or more calibrated capacitance values of a subset capacitive touch sensors in response to receiving the touch on the screen;
determining a number of touch points from the touch based on one or more local maximum calibrated capacitance values from the one or more calibrated capacitance values, wherein a local maximum calibrated capacitance value is a highest calibrated capacitance value obtained from neighboring capacitive touch sensors in the subset capacitive touch sensors, and wherein the local maximum calibrated capacitance value corresponds to a touch point;
determining, for each touch point, a location of a touch point among n preset locations based on a respective local maximum calibrated capacitance value of a first capacitive touch sensor from the subset capacitive touch sensors and a second calibrated capacitance value of a second capacitive touch sensor neighboring the first capacitive touch sensor, wherein the n preset locations are allocated around the screen, wherein each preset location corresponds to a control instruction, and wherein the n is an integer greater than the N; and
executing one or more control instructions that correspond to one or more locations of the touch points.

2. The method of claim 1, wherein obtaining the calibrated capacitance values of the N capacitive touch sensors comprises, for each capacitive touch sensor:
obtaining a capacitance variation of a respective capacitive touch sensor, wherein the capacitance variation of the capacitive touch sensor is a first capacitance value of the respective capacitive touch sensor minus an initial value of the respective capacitive touch sensor, and wherein the initial value is a second capacitance value of the respective capacitive touch sensor when the smartwatch is not touched;
calibrating the capacitance variation of the respective capacitive touch sensor; and
setting a value obtained by calibrating the capacitance variation of the respective capacitive touch sensor as a calibrated capacitance value of the respective capacitive touch sensor.

3. The method of claim 2, wherein calibrating the capacitance variation of the respective capacitive touch sensor and setting the value obtained by calibrating the capacitance variation of the respective capacitive touch sensor as the calibrated capacitance value of the respective capacitive touch sensor comprises:
determining a calibration coefficient of a capacitive touch sensor i (K(i)) based on a maximum capacitance variation of the capacitive touch sensor i (MAX_DEL_CDC (i)), wherein the capacitive touch sensor i is any one of the N capacitive touch sensors, and wherein zero≤i≤N−one; and
multiplying a capacitance variation of the capacitive touch sensor i (DEL_CDC(i)) by the K(i) to obtain a calibrated capacitance value of the capacitive touch sensor i (CDC(i)) such that CDC(i)=DEL_CDC(i)*K(i).

4. The method of claim 3, wherein determining the K(i) comprises:
obtaining the MAX_DEL_CDC(i);
calculating an average value of maximum capacitance variations of the N capacitive touch sensors (AVG_DEL_CDC) using an equation:

$$AVG\_DEL\_CDC = \frac{\sum_{j=0}^{N-1} MAX\_DEL\_CDC(j)}{N};$$

and
setting a ratio of the AVG_DEL_CDC to the MAX_DEL_CDC(i) as the K(i), such that $$K(i) = \frac{AVG\_DEL\_CDC}{MAX\_DEL\_CDC(i)}.$$

5. The method of claim 1, wherein determining the number of touch points comprises:
comparing the maximum values of the calibrated capacitance values of the N capacitive touch sensors with a preset capacitance threshold; and
setting a number of calibrated capacitance values in the calibrated capacitance values of the N capacitive touch sensors whose maximum values are greater than the preset capacitance threshold as the number of touch points.

6. The method of claim 1, wherein determining, for each touch point, the location of the touch point comprises determining, for each touch point, a circumferential angle (P) of the touch point based on the respective local maximum calibrated capacitance value and the second calibrated capacitance value, wherein a center point of a display user interface of the smartwatch is used as a start point and an angle corresponding to a ray horizontally extending rightward from the start point is used as zero degrees, and wherein the P is an angle by which the ray rotates around the start point in a counterclockwise direction to the touch point.

7. The method of claim 6, wherein executing the one or more control instructions comprises:
determining, according to a preset mapping rule, a mapping point corresponding to a P of a first touch point, wherein the mapping point corresponds to an application displayed on the display user interface, and wherein the first touch point is any touch point; and
executing a control instruction for the application corresponding to the mapping point matching the number of the touch points and a P of each touch point.

8. The method of claim 7, wherein determining the mapping point corresponding to the P of the first touch point comprises determining, based on a location of the application, a geometric shape defined by the N capacitive touch sensors, and the P of the first touch point, the mapping point corresponding to the P of the first touch point.

9. The method of claim 6, wherein determining, for each touch point, the P of the touch point comprises defining a circular ring or an elliptical ring by the N capacitive touch sensors when each of the N capacitive touch sensors is in a circular arc shape, and wherein a P of a touch point located on a capacitive touch sensor k is:

$$P = APS*((k-1+N)\% \ N) + \frac{APS*[CDC((k-1+N)\% \ N)*1 + CDC(k)*2 + CDC((k+1+N)\% \ N)*3]}{CDC((k-1+N)\% \ N) + CDC(k) + CDC((k+1+N)\% \ N)},$$

wherein zero≤k≤N−one, wherein APS is a value of a P corresponding to one capacitive touch sensor, wherein APS=360/N, wherein % is a modulo operator, wherein the N capacitive touch sensors are sequentially numbered counterclockwise from zero to N−one, and wherein capacitive touch sensor zero is disposed horizontally upward and located on a right side of the center point of the display user interface of the smartwatch.

10. The method of claim 8, wherein determining the mapping point corresponding to the P of the first touch point comprises defining a circular ring by the N capacitive touch sensors when each of the N capacitive touch sensors is in a circular arc shape, wherein a radius of an inner circle of the circular ring is r, wherein coordinates of a circle center are (a, b), wherein an origin of a Cartesian coordinate system is in an upper left corner of the inner circle of the circular ring, wherein a horizontal coordinate is tangent to the inner circle of the circular ring horizontally rightward, wherein a vertical coordinate is tangent to the inner circle of the circular ring vertically downward, wherein coordinates of the mapping point corresponding to the P of the first touch point are (x, y) when a center point of an icon of each application displayed on the display user interface of the smartwatch is located on a circular contour using (a, b) as the circle center and $r_1$ as a radius, wherein x=a+$r_1$*cos(P), wherein y=b−$r_1$*sin(P), and wherein zero<$r_1$≤r.

11. The method of claim 8, wherein determining the mapping point corresponding to the P of the first touch point comprises defining an elliptical ring by the N capacitive touch sensors when each of the N capacitive touch sensors is in a circular arc shape, wherein coordinates of a center point of the elliptical ring are (a, b), wherein a major radius of an inner ellipse of the elliptical ring is Lr, wherein a minor radius of the inner ellipse of the elliptical ring is Sr, wherein coordinates of the mapping point corresponding to the P of the first touch point are (x, y) when a center point of an icon of each application displayed on the display user interface of the smartwatch is located on an elliptical contour using (a, b) as a center point, Lr' as a major radius, and Sr' as a minor radius, zero<Lr'≤Lr, and zero<Sr'≤Sr, wherein x=a+Sr'*cos(P), wherein y=b−Lr'*sin(P), wherein major radii Lr and Lr' are oriented vertically, and wherein minor radii Sr and Sr' are oriented horizontally.

12. A smartwatch, comprising:
a screen configured to detect a touch thereon;
N capacitive touch sensors disposed around the screen and configured to receive a touch on the screen in association with a subset of N capacitive touch sensors, wherein N is an integer greater than one;
a receiver configured to obtain one or more calibrated capacitance values of the subset capacitive touch sensors in response to receiving the touch via the subset capacitive touch sensors; and
a processor coupled to the screen, the N capacitive touch sensors, and the receiver and configured to:
determine a number of touch points from the touch based on one or more local maximum values from the one or more calibrated capacitance values, wherein a local maximum calibrated capacitance value is a highest calibrated capacitance value obtained from neighboring capacitive touch sensors in the subset capacitive touch sensors, and wherein the local maximum calibrated capacitance value corresponds to a touch point;
determine, for each touch point, a location of a touch point among n preset locations based on a respective local maximum calibrated capacitance value of a first capacitive touch sensor from the subset capacitive touch sensors and a second calibrated capacitance value of a second capacitive touch sensor neighboring the first capacitive touch sensor, wherein the n preset locations are allocated around the screen, wherein each preset location corresponds to a control instruction, and wherein the n is an integer greater than the N; and
execute one or more control instructions that correspond to one or more locations of the touch points.

13. The smartwatch of claim 12, wherein the receiver is further configured to:
obtain, for each capacitive touch sensor, a capacitance variation of a respective capacitive touch sensor, wherein the capacitance variation of the respective capacitive touch sensor is a first capacitance value of the respective capacitive touch sensor minus an initial value of the respective capacitive touch sensor, wherein the initial value is a second capacitance value of the respective capacitive touch sensor when a user does not touch the smartwatch, and
wherein for each capacitive touch sensor, the processor is further configured to:
calibrate the capacitance variation of the respective capacitive touch sensor; and
set a value obtained by calibrating the capacitance variation of the respective capacitive touch sensor as a calibrated capacitance value of the respective capacitive touch sensor.

14. The smartwatch of claim 13, wherein the processor is further configured to:
determine a calibration coefficient of a capacitive touch sensor i (K(i)) based on a maximum capacitance variation of the capacitive touch sensor i (MAX_DEL_CDC (i)), wherein the capacitive touch sensor i is any one of the N capacitive touch sensors, and wherein zero≤i≤N−one; and
multiply a capacitance variation of the capacitive touch sensor i (DEL_CDC(i)) by the K(i) to obtain a calibrated capacitance value of the capacitive touch sensor i (CDC(i)) such that CDC(i)=DEL_CDC(i)*K(i).

15. The smartwatch of claim 14, wherein the processor is further configured to:
obtain the MAX_DEL_CDC(i);
calculate an average value of maximum capacitance variations of the N capacitive touch sensors (AVG_DEL_CDC) using an equation:

$$\text{AVG\_DEL\_CDC} = \frac{\sum_{j=0}^{N-1} \text{MAX\_DEL\_CDC}(j)}{N};$$

and
set a ratio of the AVG_DEL_CDC to the MAX_DEL_CDC(i) as the K(i), such that $$K(i) = \frac{\text{AVG\_DEL\_CDC}}{\text{MAX\_DEL\_CDC}(i)}.$$

16. The smartwatch of claim 12, wherein the processor is further configured to:
compare the maximum values of the calibrated capacitance values of the N capacitive touch sensors with a preset capacitance threshold; and
set a number of calibrated capacitance values in the calibrated capacitance values of the N capacitive touch sensors whose maximum values are greater than the preset capacitance threshold as the number of the touch points.

17. The smartwatch of claim 12, wherein the processor is further configured to determine, for each touch point, a circumferential angle (P) of the touch point based on the respective local maximum calibrated capacitance value and the second calibrated capacitance value, wherein a center point of a display user interface of the smartwatch is used as a start point and an angle corresponding to a ray horizontally extending rightward from the start point is used as zero degrees, and wherein the P is an angle by which the ray rotates around the start point in a counterclockwise direction to the touch point.

18. The smartwatch of claim 17, wherein the processor is further configured to:
determine, according to a preset mapping rule, a mapping point corresponding to a P of a first touch point, wherein the mapping point corresponds to an application displayed on the display user interface, and wherein the first touch point is any touch point; and
execute a control instruction for the application corresponding to the mapping point matching the number of the touch points and a P of each touch point.

19. The smartwatch of claim 18, wherein the processor is further configured to determine, based on a location of the application, a geometric shape defined by the N capacitive touch sensors, and the P of the first touch point, the mapping point corresponding to the P of the first touch point.

20. The smartwatch of claim 17, wherein the processor is further configured to define, using the N capacitive touch sensors, a circular ring or an elliptical ring when each of the N capacitive touch sensors is in a circular arc shape, and wherein a P of a touch point located on a capacitive touch sensor k is:

$$P = APS*((k-1+N)\% \ N) + \frac{APS*[CDC((k-1+N)\% \ N)*1 + CDC(k)*2 + CDC((k+1+N)\% \ N)*3]}{CDC((k-1+N)\% \ N) + CDC(k) + CDC((k+1+N)\% \ N)}$$

wherein zero≤k≤N−one, wherein APS is a value of a P corresponding to one capacitive touch sensor, wherein APS=360/N, wherein % is a modulo operator, wherein the N capacitive touch sensors are sequentially numbered clockwise from zero to N−one, and wherein capacitive touch sensor zero is disposed horizontally upward and located on a right side of the center point of the display user interface of the smartwatch.

* * * * *